United States Patent
Martin et al.

(10) Patent No.: US 12,024,393 B2
(45) Date of Patent: Jul. 2, 2024

(54) DESPOOLERS

(71) Applicant: Forney Industries, Inc., Fort Collins, CO (US)

(72) Inventors: Samuel Zachary Martin, Fort Collins, CO (US); Jason T. Mahugh, Windsor, CO (US); James Joshua Legoza, Fort Collins, CO (US)

(73) Assignee: Forney Industries, Inc., Fort Collins, CO (US)

( * ) Notice: Subject to any disclaimer, the term of this patent is extended or adjusted under 35 U.S.C. 154(b) by 156 days.

(21) Appl. No.: 17/664,148

(22) Filed: May 19, 2022

(65) Prior Publication Data
US 2022/0402722 A1    Dec. 22, 2022

Related U.S. Application Data

(60) Provisional application No. 63/211,847, filed on Jun. 17, 2021.

(51) Int. Cl.
*B65H 59/04*    (2006.01)
*B23K 9/133*    (2006.01)

(52) U.S. Cl.
CPC .......... *B65H 59/04* (2013.01); *B23K 9/1333* (2013.01); *B65H 2701/36* (2013.01)

(58) Field of Classification Search
CPC ............................. B65H 59/04; B65H 2701/36
See application file for complete search history.

(56) References Cited

U.S. PATENT DOCUMENTS

| | | | | |
|---|---|---|---|---|
| 1,950,492 A | * | 3/1934 | Holmer, Jr. | B65H 49/305 242/575.5 |
| 4,360,172 A | * | 11/1982 | Cope | B65H 49/32 242/423.1 |
| 4,625,931 A | * | 12/1986 | Tamura | B65H 16/04 242/597.5 |
| 5,318,234 A | | 6/1994 | Biggs et al. | |
| 5,322,236 A | * | 6/1994 | Smith | B65H 49/32 118/420 |
| 5,725,175 A | * | 3/1998 | Thundathil | B65H 59/04 242/594.3 |
| 6,634,592 B1 | | 10/2003 | Berousek | |
| 7,004,373 B1 | | 2/2006 | Miller | |
| 7,909,284 B2 | * | 3/2011 | Burns | B23K 9/133 242/423.1 |
| 10,167,168 B1 | * | 1/2019 | Bonner | B65H 49/32 |
| 10,287,129 B2 | | 5/2019 | Madrid et al. | |
| 11,103,950 B2 | | 8/2021 | Elcic et al. | |
| 2004/0200819 A1 | * | 10/2004 | Kensrue | B23K 9/1333 219/137.7 |
| 2006/0226276 A1 | | 10/2006 | Pierce et al. | |

(Continued)

*Primary Examiner* — William A. Rivera
(74) *Attorney, Agent, or Firm* — HOLZER PATEL DRENNAN

(57) ABSTRACT

A kit or set of components, which can be assembled, in a mix-and-match manner, to provide multiple, different despoolers, for different wire spool sizes. One particular kit or set has components to provide three unique despoolers; the kit has a shaft, a tension spring, a first shaft body, a second shaft body having a length different than the length of the first shaft body, and a tension lock. The components provide despoolers that are easy to install and easy to set-up, having a limited number of components, and that are easy to use.

19 Claims, 29 Drawing Sheets

(56) References Cited

U.S. PATENT DOCUMENTS

| | | | |
|---|---|---|---|
| 2016/0289040 A1* | 10/2016 | Schmitz | B65H 49/36 |
| 2017/0064933 A1* | 3/2017 | Tseng | B65H 54/12 |
| 2018/0099834 A1* | 4/2018 | Madrid | B65H 75/02 |
| 2022/0144582 A1* | 5/2022 | Weaver | B65H 75/182 |

* cited by examiner

DESPOOLERS

CROSS-REFERENCE

This application claims priority to U.S. provisional application No. 63/211,847 filed Jun. 17, 2021 and titled DESPOOLER, the entire disclosure of which is incorporated herein by reference for all purposes.

BACKGROUND

On traditional wire-feed welding machines or power supplies, also commonly referred to as MIG (GMAW) or Flux-Core (FCAW) welding machines, a consumable spool of coiled electrically-conductive welding wire is unraveled at variable speeds during the welding process. This consumable wire of variable composition is pulled from the spool via an electronic wire-feeding mechanism. Contact with electrically charged surfaces within the wire-feed mechanism electrically polarizes the consumable wire. After passing through the wire-feed mechanism, the consumable wire is then fed or pushed through the cable (commonly referred to as the welding lead) that connects the welding gun or torch to the welding machine or power supply. Once the consumable wire exits the front end of the welding gun or torch, it is rapidly converted into molten form via electric arc. This arc is generated when a path to ground is established via an oppositely polarized clamp (commonly referred to as the "ground" or "Earth" clamp), completing the circuit back to the welding machine or power supply.

Consumable welding wire spools are available in several diameters and thicknesses. The wire, being generally flexible in nature, is capable of storing potential energy as it is tightly wound onto the spool or hub by the manufacturer. This stored potential energy can build up such that when the free end of the spooled wire is released, energy is rapidly liberated in the form of several coils unfurling. This unfurling can potentially void the usability of the entire spool. If the free end of the coiled wire becomes tangled underneath one or more of the other coils on the spool, it is nearly impossible to detect on the part of the user. If the spool is then prepared for use with a welding machine or power supply with this entanglement present, there is no practical way to determine how much of the wire on the spool can be salvaged before the spool locks up and becomes unusable.

Wire-feed welding machines can create welds of varying quality based on several factors, many of which are controllable by the operator. Generally, wire-feed should be steady and consistent for high quality functional welds. As the stability of the wire-feed decreases, weld quality will observably and dramatically deteriorate.

A spool holder (also commonly referred to as a despooler) is a device or mechanism that holds or retains the spool of welding wire during the welding process. Spool holders can be mounted internally or externally with respect to the welding machine or power supply. Welding wire spools are generally mounted via a central hub onto the despooler about the central axis of rotation of both the spool and the despooler.

During the welding process, the pulling force exerted on the free end of the welding wire by the wire-feed mechanism acts as a moment or torque which is directly translated into the rotation of the spool. The higher the rate of wire-feed through the wire-feed mechanism, the faster the spool will rotate, releasing wire as it turns about its central axis. Because the welding wire spool is mounted to the despooler, they will both rotate in tandem when this pulling force is present.

When the weld is terminated by the operator, the feed of the wire halts but the spool has a tendency to continue its rotation until acted upon by an opposing friction force. If no opposing friction force is present, the inertia of the rotating spool could aid in the liberation of the potential energy stored in the coils of the spool, resulting in the wire continuing to unwind.

The despooler serves as a "brake" to oppose this rotation and bring the spool to a stop shortly after the pull force from the wire-feed mechanism is no longer present. On traditional despoolers, the braking force is generated by a spring that interacts with a friction plate within the despooler mechanism. The spring tension is set arbitrarily by the operator based on several factors including, but not limited to, the size (diameter and width) of the welding wire spool and the desired braking force as determined by operator experience. Generally, there is no indication of how much force is required or how much force has been applied; this is simply left up to the knowledge of the operator.

Despoolers for welding machines or power supplies with output power under 400 Amps are generally designed to accommodate three common spool diameters: 4-inch (or 100 mm), 8-inch (or 200 mm), and 12-inch (or 300 mm). Each spool size classification being different in overall mass will generally require a different braking force to overcome the angular momentum of its rotation when the weld is terminated by the user. Therefore, it is not uncommon for despooler mechanisms to be quite cumbersome, containing numerous components of similar appearance for use with different specific spool diameters. Installing a new spool or changing from one spool size to another is difficult and time consuming, and often leads to confusion on the part of the user resulting in incorrect installation. When incorrectly installed, despoolers can be detrimental to weld quality and consistency.

As previously indicated, a spool brake should exert sufficient force to stop the spool from rotating within a short time after the weld is terminated. This friction force is constantly present and must be overcome by the wire-feed mechanism while welding. The more force exerted on the spool by the despooler opposing rotation and wire-feed, the harder the wire-feed mechanism must work to counter this force. As more power is consumed by the wire feed mechanism to overcome the braking force of the despooler, less power is available for the welding output. Therefore, too much braking force will cause welding performance to degrade.

As previously indicated, wire-feed stability is critical for consistent weld quality and machine performance. If the braking force of the despooler is set too low by the user, the welding wire spool will continue to rotate under its own angular momentum when the weld is terminated by the user. This generally results in several coils of wire unfurling from the remainder of the tightly wound spool before it eventually comes to a complete stop. As the wire-feed is reinitiated by the user, these unfurled coils will be directly acted upon by the pulling force presented by the wire-feed mechanism. This pulling force will generally tighten the unfurled coils, allowing some amount of wire to pass through the wire-feed mechanism before the spool begins to rotate. Finally, once the previously unfurled coils are tightened around the remainder of the spool, the pulling force presented by the wire-feed mechanism will cause the spool to jerk into rotation. This places a sudden strain on the wire-feed mechanism resulting in wire-feed instability and lag.

During the wire-feed welding process, proper spool alignment is critical to wire-feed stability which in turn is critical for consistent weld performance and functionality. Because the wire is coiled helically about the central hub, the exact point at which wire is leaving the spool before passing through the wire-feed mechanism of the welder or power supply is highly variable, constantly changing as the spool is uncoiled. It can generally be observed from a stationary position that this point travels along the axis of rotation of the spool. This axial direction movement repeats cyclically as the wire is uncoiled throughout the life of the spool.

The point at which the welding wire enters the wire-feed mechanism is generally fixed in position. This results in the force vector creating the moment that directly translates to the rotation of the welding wire spool constantly changing as the point of wire departure from the wire spool translates along the axis of rotation. If a detailed examination of the time rate of change of these vectors was conducted over a certain interval of spool rotation, it could be observed that the average force vector points directly toward the wire feed mechanism inlet from the radial position of the center of mass of the welding wire spool. Ideally, in an independent wire-feed welding setup, the center of mass of the spool is directly in line with the wire-feed mechanism inlet and this line of action is one-dimensionally parallel to the average force vector which directly translates to the rotation of the spool. If the line of action is not parallel to the force vector acting tangentially on the spool, the force will seek equilibrium by pulling on the spool in the positive or negative direction along the central axis of rotation. This will lead to excess load on the wire-feed mechanism that is not being used efficiently to feed wire, thus taking usable energy away from the welding output. Improper alignment could also result in excess wear on despooler components or cause a positive or negative change in the amount of spool tension applied by the user. Finally, improper spool alignment can result in plastic deformation of the welding wire as it is uncoiled from the spool in the form of an introduced curvature. This curvature can have a dramatic impact on wire-feed stability, introducing difficulty as the deformed wire is fed through several feet of relatively straight welding cable or lead.

Summarized, the five main problems with traditional despooler mechanisms are:

1. Complex mechanisms lead to confusion. Each of the three spool sizes require several of their own specific despooler components during installation.
2. Easy to accidentally install despooler incorrectly. With all of the different parts and their respective combination requirements to accommodate the three spool sizes, incorrect installation is a serious issue with novice and experienced users alike.
3. Easy to accidentally apply too little spool tension. This results in the welding wire spool continuing to rotate after the weld is terminated, leading to wire-feed jerk and lag during the next welding cycle.
4. Easy to accidentally apply too much spool tension. This allows for smooth wire-feed, but extra power is consumed by the wire-feed motor to overcome the braking force on the spool. This directly effects the welding output capabilities of the machine or power supply.
5. Improper spool alignment. Many despoolers are designed to accommodate the proper alignment of one or two of the three common spool sizes, but not all three common spool sizes. Improper alignment can be detrimental to despooler life and wire-feed stability.

The present designs address all of these issues. Described herein are despooler mechanisms and despoolers for use with most wire-feed welding machines or power supplies that solve each of these issues.

SUMMARY

As indicated above, the present disclosure is directed to wire spool despoolers and despooler mechanisms. The disclosure provides a set of components that can be used, in a mix-and-match manner, to assemble at least three despoolers configured for receiving at least three different sizes of welding wire spools. The despoolers have an automatic central alignment of the wire spool in relation to a wire-feed mechanism, regardless of the wire spool size.

Each of the despoolers automatically provides the optimum despooling tension; that is, there is nothing for the user to manipulate in order to adjust the tension on the wire spool. By locking the wire spool on the shaft with a non-threaded mechanism, the over-tensioning or under-tensioning of the spool is inhibited or even eliminated.

This disclosure describes, in one particular embodiment, a wire spool despooler assembly set. The set includes a shaft, a compressible tension spring configured to be received axially on the shaft between the distal end and the proximal end of the shaft, a tension lock configured to be received on the distal end of the shaft, a first shaft body having a length, a second shaft body having a length greater than the first shaft body length, and a locking ring configured to be received on the first shaft body and the second shaft body. From these components, a first despooler can be formed that utilizes the shaft, the tension spring and the tension lock. A second despooler can be formed that utilizes the shaft, the tension spring, the first shaft body, the tension lock and the locking ring. A third despooler can be formed that utilizes the shaft, the tension spring, the second shaft body, the tension lock and the locking ring.

This disclosure also describes a wire spool despooler that has a shaft having a distal end and a trackway extending along the shaft from the distal end and having a terminal turn extending around the shaft about 10 to 90 degrees from the trackway. The despooler also has a compressible tension spring configured to be received axially on the shaft between the distal end and a proximal end of the shaft, and a tension lock having an internal bore with at least one radially inward extending post configured to be received in the trackway. To this despooler can be added a shaft body configured to be axially aligned and received on the shaft and a locking ring configured to engage with the shaft body, to form a second despooler, e.g., for a larger wire spool.

This disclosure also describes a wire spool despooler having a shaft with a distal end and a proximal end, a compressible tension spring configured to be received axially on the shaft between the distal end and the proximal end, and a tension lock having an internal bore configured to be received on the distal end of the shaft in a non-threaded manner.

These and other aspects of the despoolers, the despooler mechanism, and despooler assembly described herein will be apparent after consideration of the Detailed Description and Figures herein. It is understood, however, that the scope of the claimed subject matter shall be determined by the claims as issued and not by whether given subject matter addresses any or all issues noted in the Background or includes any features or aspects recited in the Summary.

DETAILED DESCRIPTION

Figure 1:
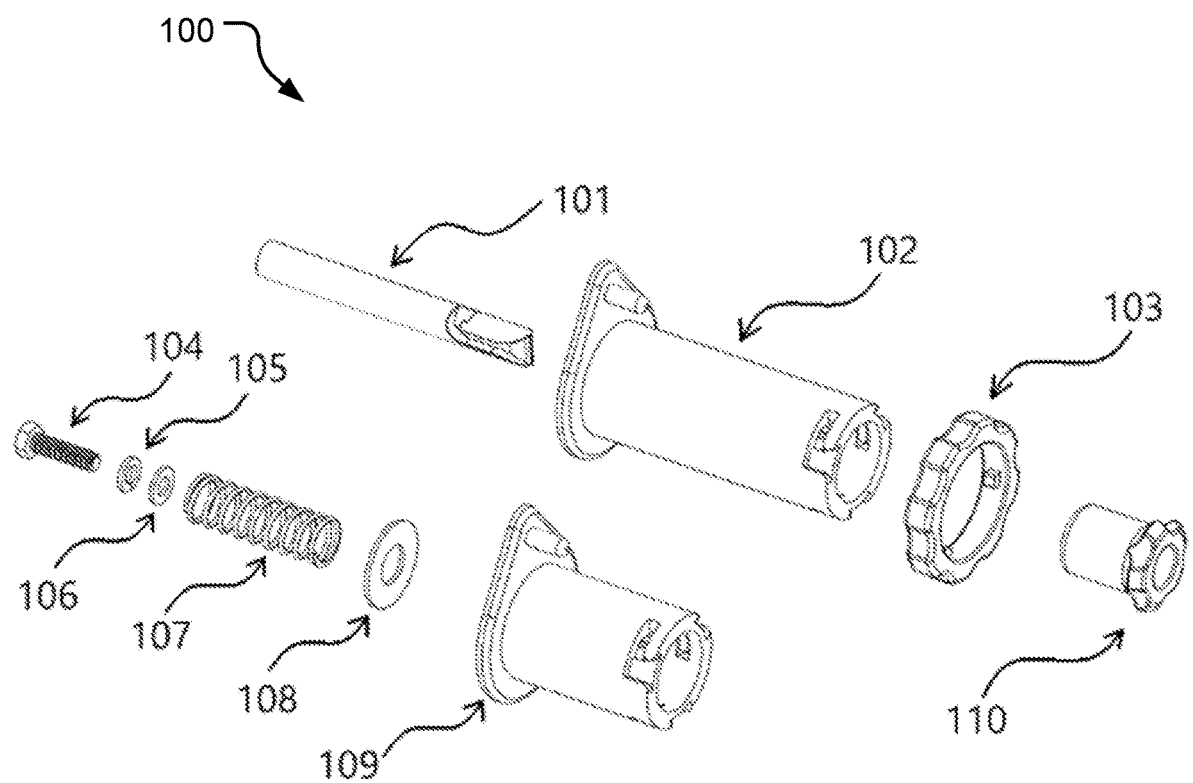
FIG. 1 is a perspective view of a set of components for several despoolers.

As indicated above, the present disclosure is directed to despooler mechanisms. The despoolers are easy to install, set-up, and use having a limited number of components.

The present disclosure describes a kit or set of components, which can be assembled, in a mix-and-match manner, to provide multiple different despoolers. For ease of assembly, the different components may be labeled, color coded, or otherwise display various indicators such that components clearly indicate proper assembly, order, and grouping requirements for each of the despooler setups. One particular kit or set has components to provide three despoolers, for three different wire spool sizes, with each of the despoolers utilizing the same tension spring. In some embodiments, the kit or set has approximately ten separable components, although the number of components may vary based on the design and/or manufacturing methods chosen for the components.

In the following description, reference is made to the accompanying drawing that forms a part hereof and in which is shown by way of illustration at least one specific implementation. The following description provides additional specific implementations. It is understood that other implementations are contemplated and may be made without departing from the scope or spirit of the present disclosure. The following detailed description, therefore, is not to be taken in a limiting sense. While the present disclosure is not so limited, an appreciation of various aspects of the disclosure will be gained through a discussion of the examples, including the figures, provided below. In some instances, a reference numeral may have an associated sub-label consisting of a lower-case letter to denote one of multiple similar components. When reference is made to a reference numeral without specification of a sub-label, the reference is intended to refer to all such multiple similar components.

Turning to the figures, FIG. 1 illustrates a set 100 of components for several different despoolers. The set 100 includes a shaft 101, a spool locking ring 103, and a tension lock 110. Each of the shaft 101, the spool locking ring 103, and the tension lock 110 are configured to axially align. Also shown is a shaft mounting bolt 104, a lock washer 105 and a flat washer 106, a tension spring 107, and a friction washer 108. Each of the shaft mounting bolt 104, the lock washer 105, the flat washer 106, the tension spring 107 and the friction washer 108 are configured to axially align.

Also included in the set 100 is a first shaft body 102 and a second shaft body 109, having a length less than the first shaft body 102, both shaft bodies 102, 109 configured to axially fit over the shaft 101, which can be referred to as an internal shaft 101. The first shaft body 102 is used for one size of wire spool (e.g., 12 inch (300 mm)), and the second shaft body 109 is used for a different size of wire spool (e.g., 8 inch (200 mm)). The first shaft body 102 may be 4 inches longer than the second shaft body 109, or may be about 4 inches longer than the second shaft body 109.

In some embodiments, one or more of the washers 105, 106, 108 may be eliminated as a separate component, for example, combined with another component (e.g., the friction washer 108 may be integral with the spring 107) or completely eliminated (e.g., no flat washer 106 is present).

These components from the set 100 can be assembled to provide three different despoolers, for at least three different sizes of wire spool.

Before a spool of welding wire is installed on to any of the despoolers made from the components of the set 100, the despooler is secured or mounted to a sturdy surface capable of supporting the spool of welding wire. Generally, the despooler is installed within a small compartment (commonly referred to as the "cabinet") contained in the welding machine or power supply itself, although in some designs the despooler may be mounted externally.

Figure 2:
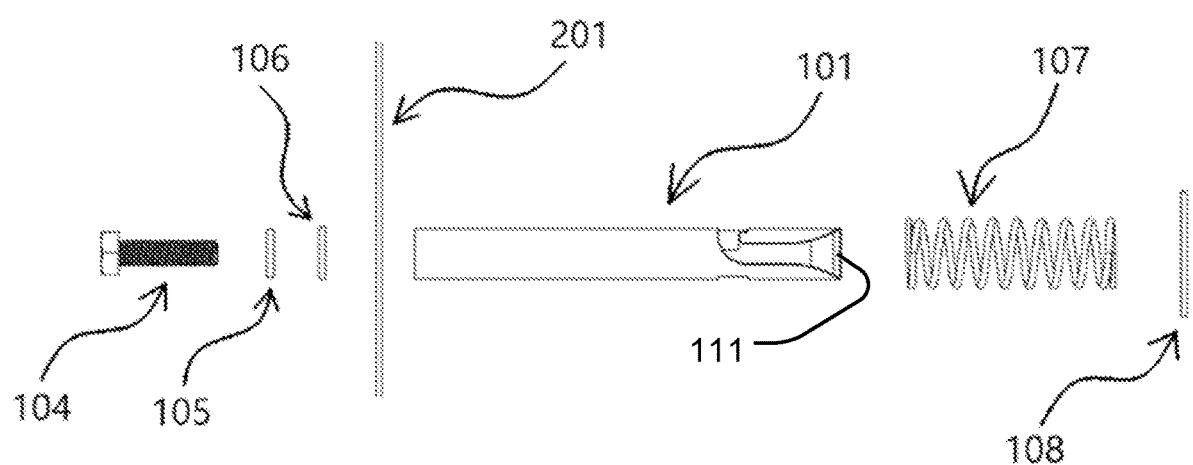
FIG. 2 is a side view of components for a shaft assembly of a first despooler.

In FIG. 2, a mounting plate 201 is shown, which may be a wall of the welding machine or power supply or may be some other sturdy surface onto which the despooler is to be mounted. The mounting plate 201 is typically oriented vertically. In FIG. 2, the internal shaft 101 and various other components are shown relative to the plate 201 and aligned for assembly.

Figure 3:
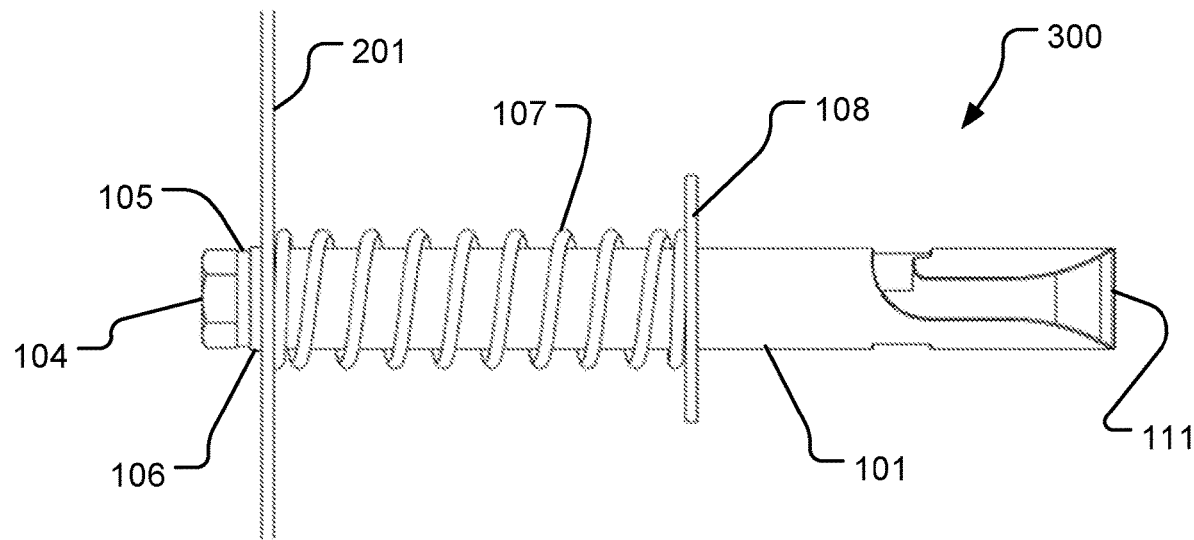
FIG. 3 is a side view of the shaft assembly of FIG. 2 assembled.

The internal shaft 101 is passed through a hole or aperture (not shown) in the plate 201 and attached to the plate 201 with the mounting bolt 104 and washers 105, 106. The bolt 104 and washers 105, 106 are at a proximal end of the shaft 101. The tension spring 107 and the friction washer 108 are slid on to the shaft 101 over a distal end 111 after the shaft installation is complete. FIG. 3 shows the assembled shaft assembly 300 through the plate 201.

In an alternate design, the shaft 101, rather than be configured to be mounted to the support plate 201 with the bolt 104 and washers 105, 106, may be permanently affixed (e.g., welded) to the plate 201.

FIGS. 4 through 8 and the discussion below show and describe the construction and use of a first despooler made with the components shown in FIG. 1, the despooler configured for, e.g., a 4 inch (100 mm) wire spool.

Figure 4:
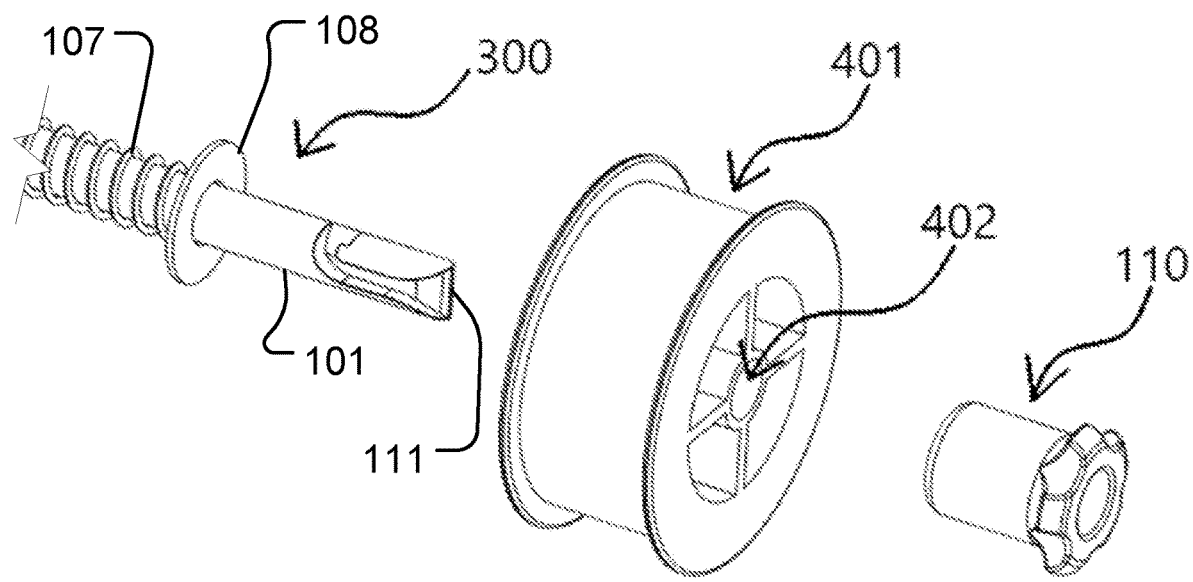
FIG. 4 is a perspective view of the shaft assembly of FIG. 3 with a wire spool.
Figure 5:
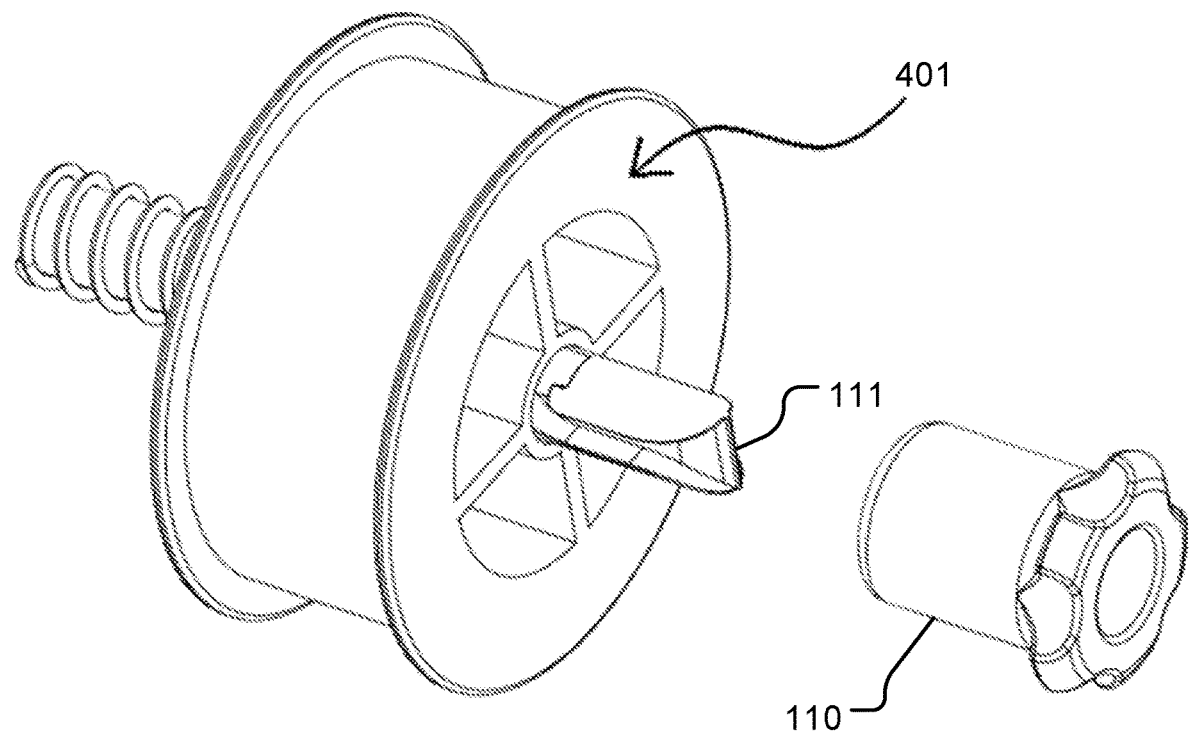
FIG. 5 is an enlarged perspective view of the shaft assembly with the wire spool.

FIG. 4 and FIG. 5 show a welding wire spool 401 installed onto the previously assembled and mounted shaft assembly 300 (the proximal end having the mounting bolt 104 not seen in these figures).

The wire spool 401 is installed onto the distal end 111 of the shaft 101 of the shaft assembly 300 such that the shaft 101 passes through the central hollow portion of the spool hub 402. Having the shaft 101 through the hub 402 allows the spool 401 to rotate freely about its central axis while mounted. With the welding wire spool 401 in place on the shaft assembly 300, as shown in FIG. 5, the tension lock 110 is installed on the distal end 111 of the shaft 101.

Figure 6:
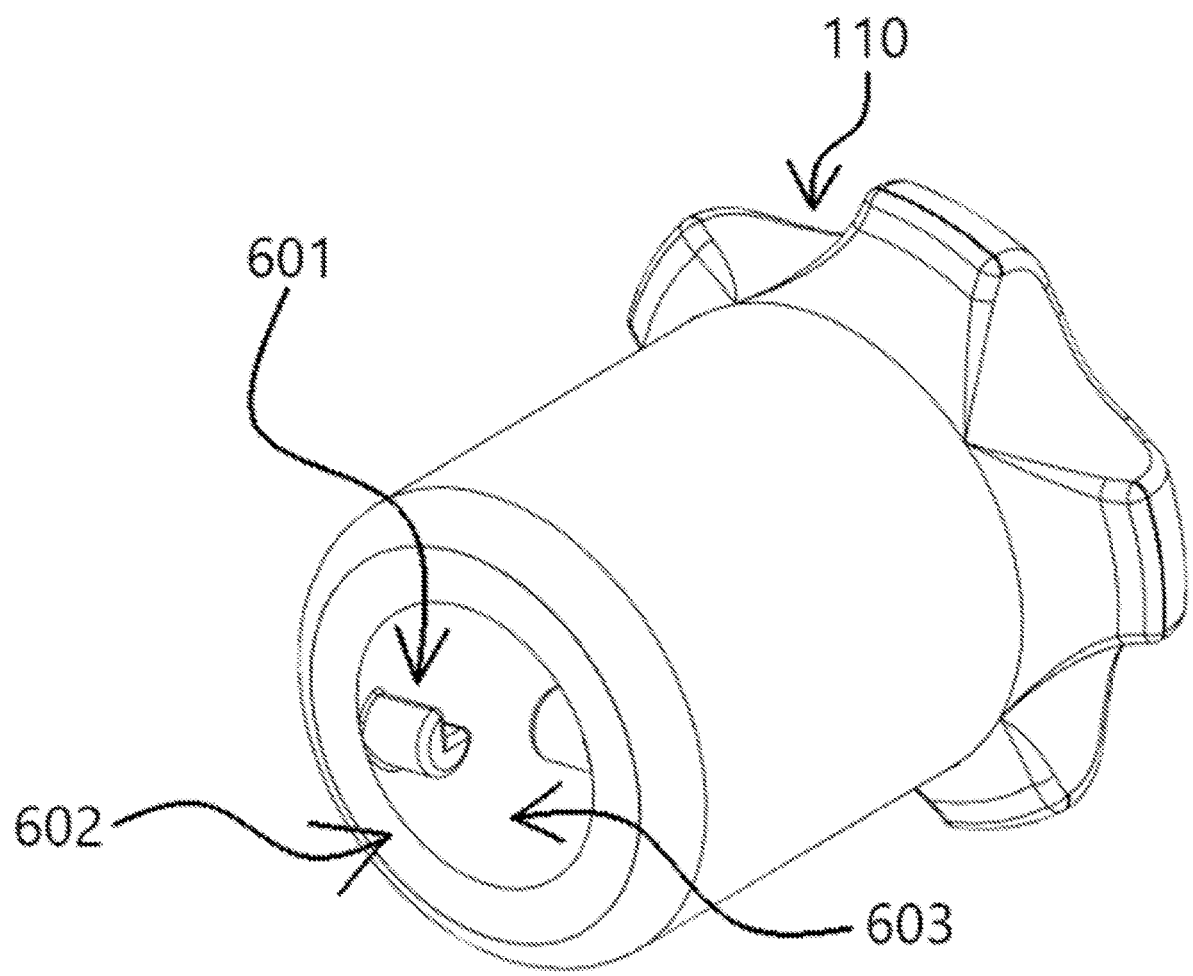
FIG. 6 is a perspective view of a tension lock.
Figure 7:
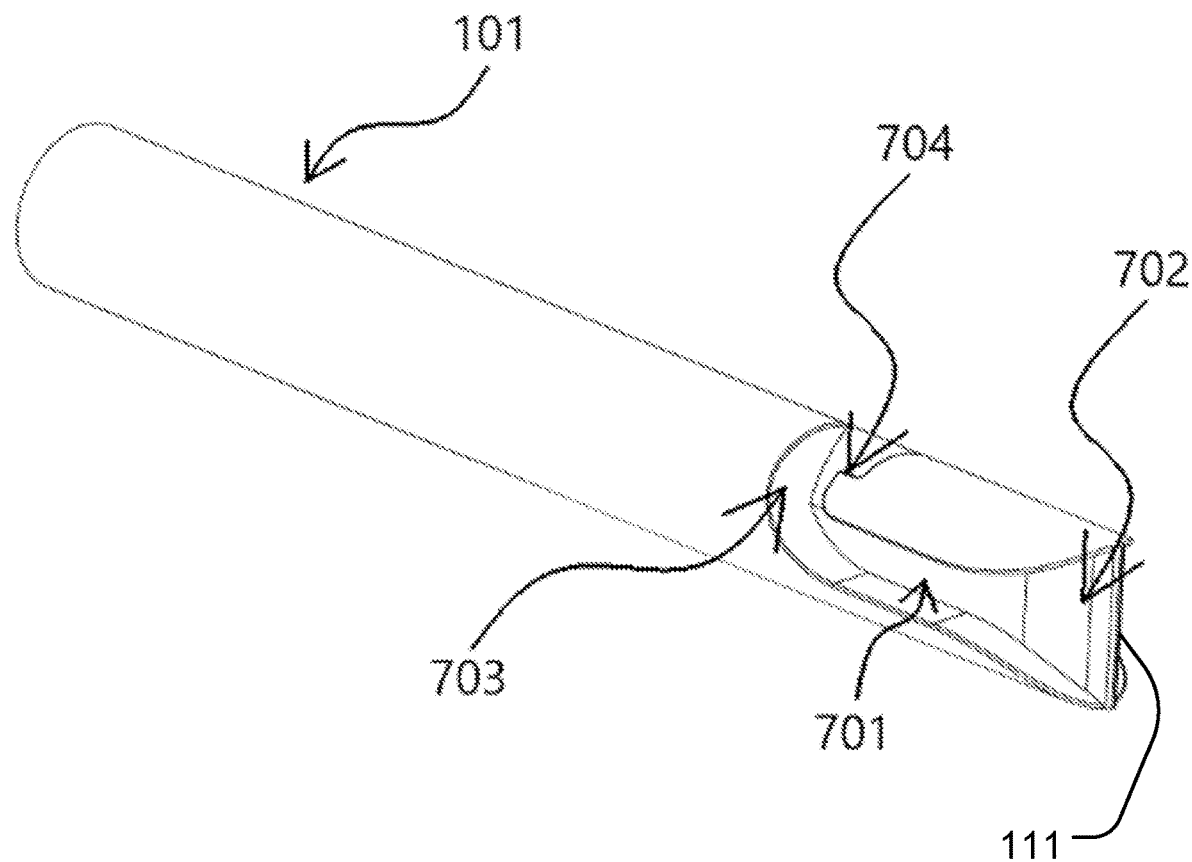
FIG. 7 is a perspective view of a shaft.

FIG. 6 illustrates details of the tension lock 110, FIG. 7 illustrates details of the shaft 101, and the following discussion describes the features that facilitate their engagement.

The tension lock 110 has an open end 602 configured to engage with the shaft 101. The open end 602 has a bore 603 with at least one radially inward extending peg or post 601. These pegs 601 are configured to be received in and interact with a trackway 701 formed at the distal end 111 of the shaft 101; at least one trackway 701 is present for each peg 601. The trackway 701 can include a flared entrance 702 to aid in the receiving of the peg 601 therein. At the opposite end, the trackway 701 can include a turn or curve 703 that has a partial rotation around the circumference of the shaft 101, e.g., less than 180 degrees, e.g., from 10 to 90-degrees. Proximate the curve 703 is a detent, shoulder or tab 704 that extends away from the distal end 111. Constructions having features similar to the trackway 701, the curve 703 and tab 704 are often referred to as quarter-turn locking features or mechanisms, or the like.

To combine the tension lock 110 with the shaft 101, the lock 110 is positioned so that the peg 601 is received into the trackway 701. Once the pegs 601 are firmly established within the trackway 701, the open end 602 of the tension lock 110, which can include a flat face, will contact and abut the face of the welding wire spool 401, thus urging the welding wire spool into contact with the friction washer 108 present on the shaft 101. When this contact is established, the tension spring 107 is pressed between the despooler mounting plate 201 and the friction washer 108 and is thus forced into compression. If sufficient force is applied to the lock 110, the pegs 601 move along the trackway 701 to the curve 703, where the pegs 601 and the lock 110 rotate relative to the shaft 101. Once this partial rotation is completed, pressure applied to the tension lock 110 by the user in the axial direction is released. This action liberates stored potential energy within the spring 107 and forces the tension lock 110 outward away from the despooler mounting surface 201. The peg 601 within the tension lock 110 may then catch on the tab 704 so that the tension lock 110 is held in position, held by the stored energy of the tension spring 107 and the tab 704.

In some embodiments, a threaded engagement may be used with or in place of the non-threaded and/or quarter-turn locking feature described above.

Figure 8:
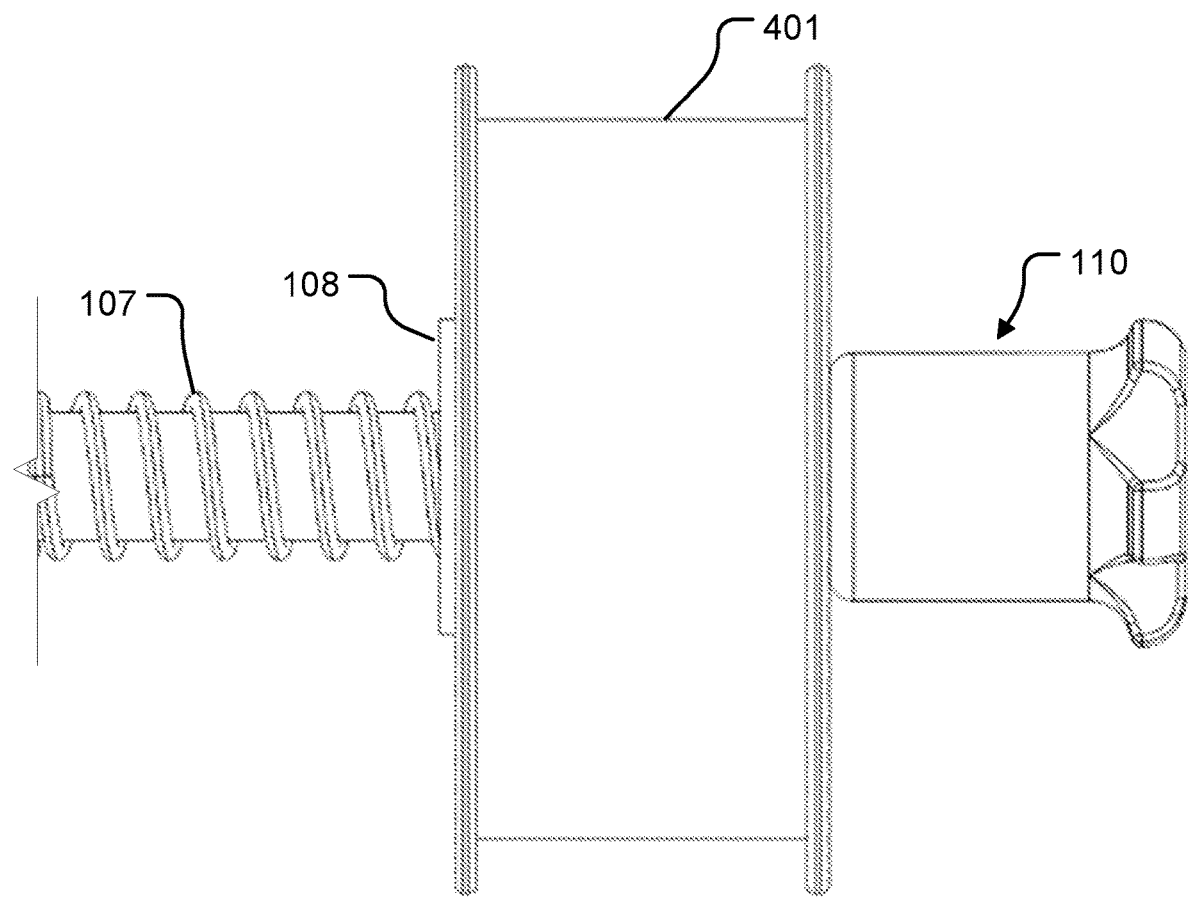
FIG. 8 is a side view of the wire spool mounted on the shaft assembly.
Figure 9:
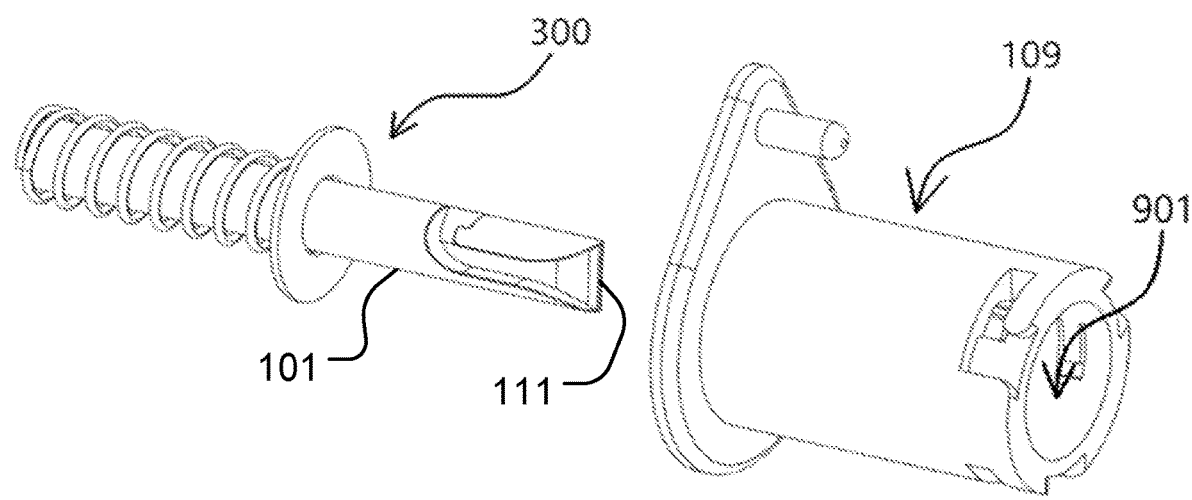
FIG. 9 is a perspective view of components for a second despooler.

A completed installation assembly of the wire spool 401 (e.g., a 4 inch (100 mm) wire spool) on the despooler mechanism is shown in FIG. 8, with the tension lock 110, the tension spring 107 and the friction washer 108 called out. Not seen in the figure is the mounting plate nor the proximal end of the shaft 101.

Disassembly of the despooler and removal of the spool simply encompasses the reversal of all of the previously discussed operations.

The previous figures, FIGS. 4 through 8, and the discussion above, have shown and described the construction and use of a first despooler made with the components from the set 100 shown in FIG. 1, the despooler configured for, e.g., a 4 inch (100 mm) wire spool.

FIGS. 9 through 17 and the discussion below show and describe the construction and use of a second despooler made with components shown in FIG. 1, the despooler configured for, e.g., an 8 inch (200 mm) wire spool.

The same completed shaft assembly 300 as from the first despooler (formed from the shaft 101, the tension spring 107, the friction washer 108, etc.) is used for this despooler. The second shaft body 109 is installed onto the shaft assembly 300, particularly over the distal end 111 of the shaft 101, so that the shaft 101 passes through a central hollow portion 901 of the shaft body 109. The shaft body 109 also includes at least one locking mechanism that provides a quarter-turn or similar locking features, additional details of which are provided below. The second shaft body 109 acts as an adapter for certain size spools (e.g., 8-inch spools) to allow certain spool hubs (much larger than that of the wire spool 401) to be centrally mounted about their axis of rotation onto the completed shaft assembly 300. Not seen in the figures, a proximal central bore may be present in the proximal end of the shaft body 109 (i.e., the end closest to the friction washer 108, when assembled).

Figure 10:
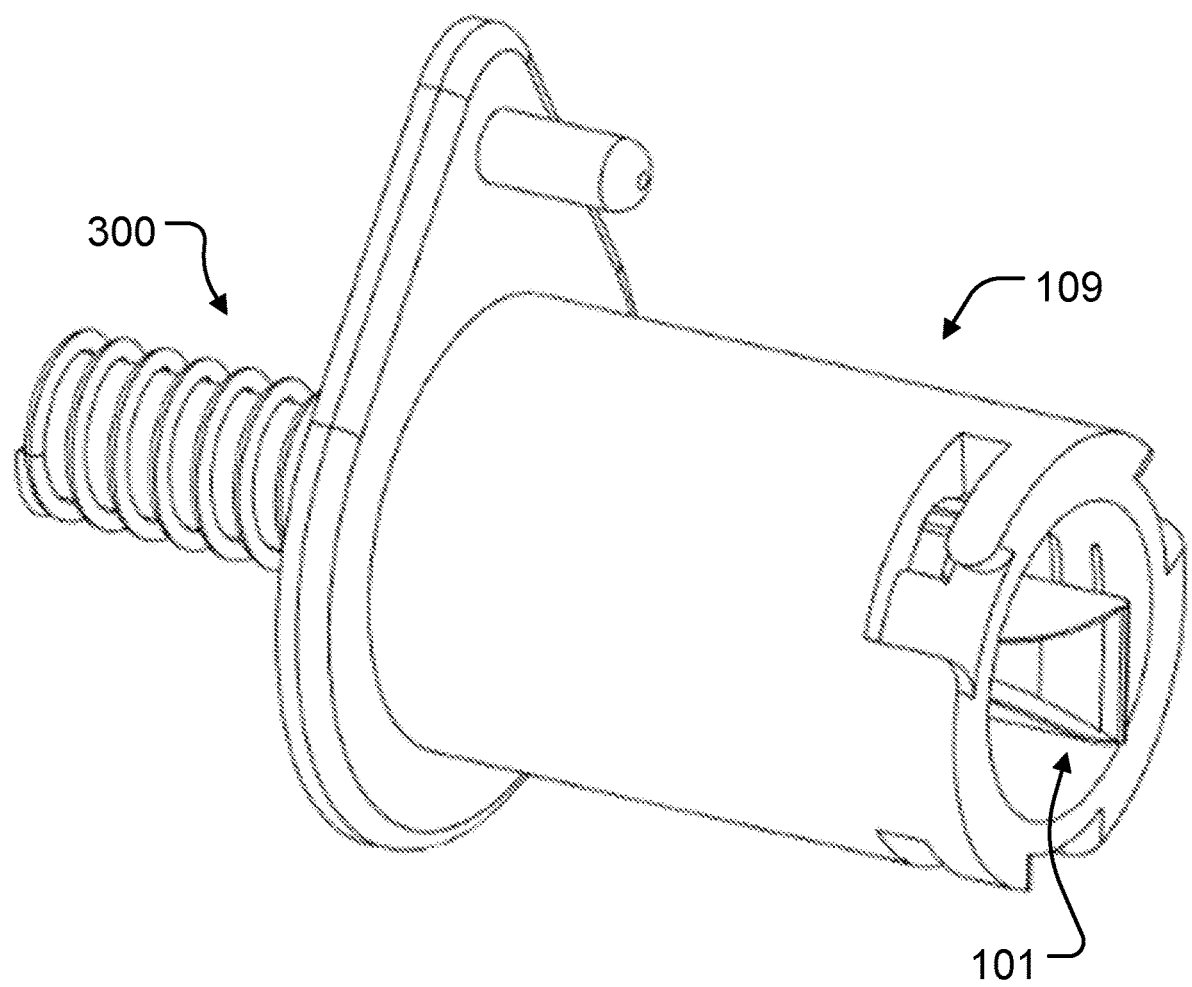
FIG. 10 is an enlarged perspective view of a portion of the second despooler.
Figure 11:
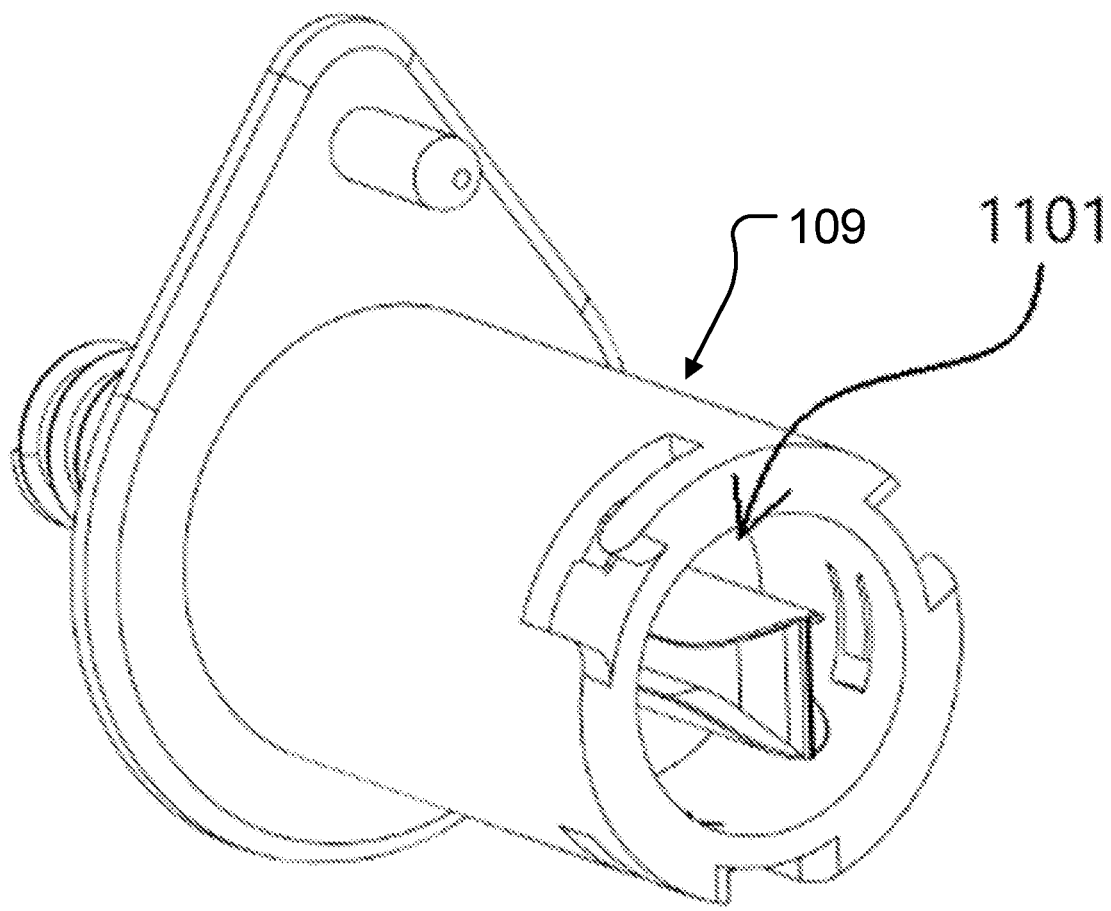
FIG. 11 is another perspective view of the portion of the second despooler.

FIGS. 10 and 11 show the shaft body 109 mounted on the shaft 101. The shaft body 109 includes a terminal face 1101. The same tension lock 110 as in the previous despooler is used in this despooler, having an open end 602 with a flat face, and pegs 601, all seen in FIG. 6. The tension lock 110 can be installed on the shaft 101 in a similar manner as described above and below.

Figure 12:
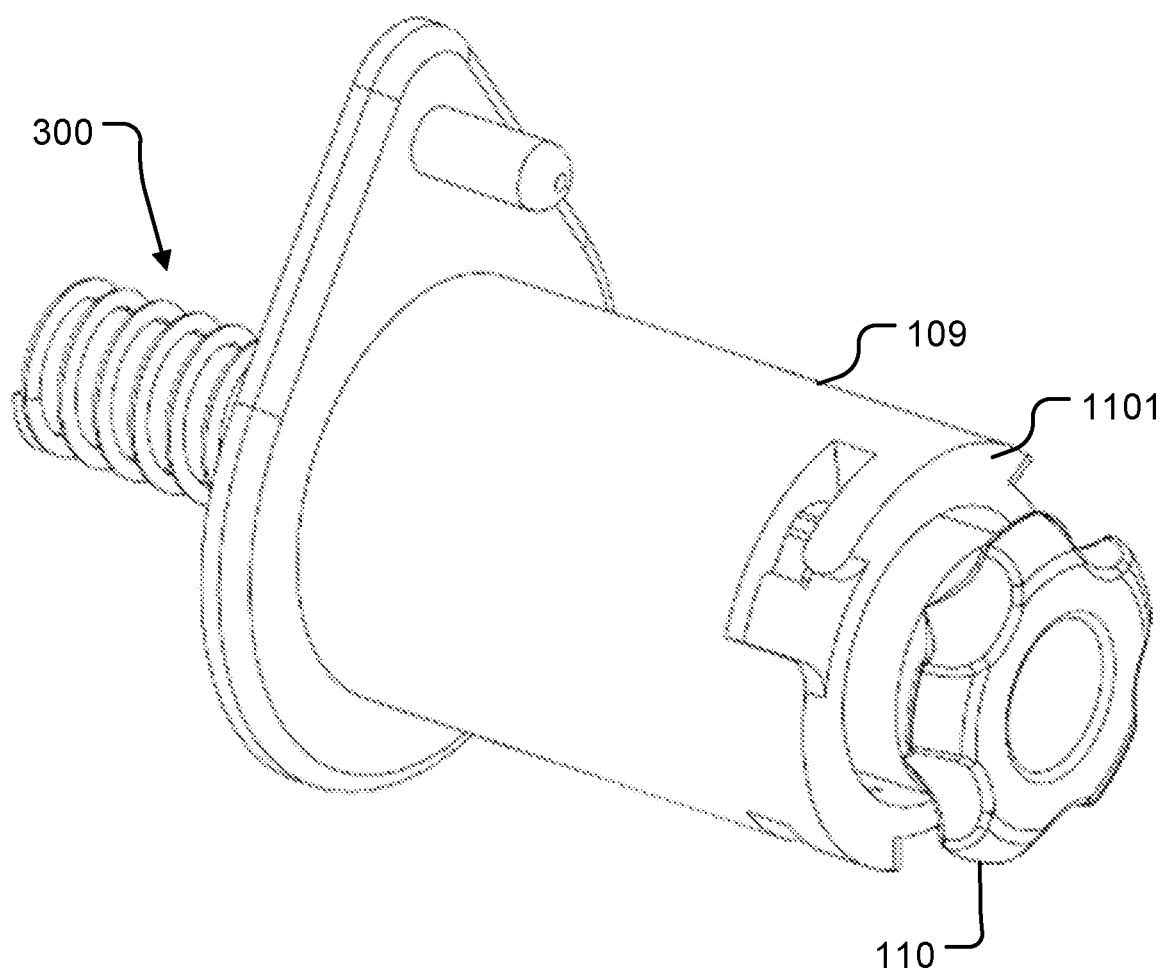
FIG. 12 is a perspective view of the portion of the second despooler with a tension lock.
Figure 13:
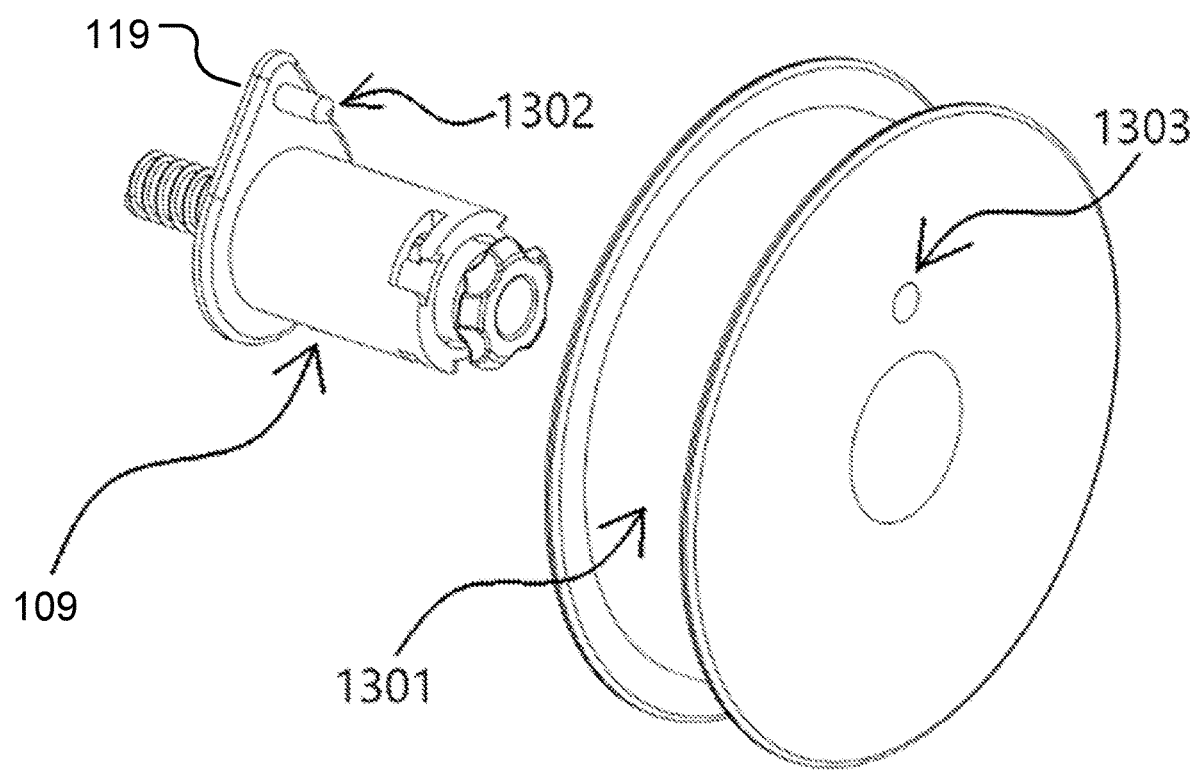
FIG. 13 is a perspective view of the portion of the second despooler with a wire spool.

FIG. 12 shows the tension lock 110 positioned on the shaft body 109. As the tension lock 110 is pressed onto the shaft 101 in its axial direction with the pegs 601 in the trackway 701 of the shaft 101, the flat face of the open end 602 of the tension lock 110 encounters the terminal face 1101 of the shaft body 109. Continued force pushes the shaft body 109 into contact with the friction washer 108. When this contact, the tension spring 107 is pressed between the despooler mounting surface or plate 201 and the friction washer 108 and is thus compressed. When the pegs 601 of the tension lock 110 reach some critical depth within the trackway 701, they encounter the curve 703 that provides a partial rotation (e.g., from 10 to 90-degrees) of the tension lock 110. Once this rotation is completed, when the pressure applied to the tension lock 110 is released, force from the tension spring 107 urges the peg 601 against the tab 704, capturing the tension lock 110 in place.

As with the first despooler, in some embodiments, a threaded engagement may be used with or in place of the non-threaded and/or quarter-turn locking feature described above.

With the shaft body 109 and the tension lock 110 in place, a wire spool 1301 (e.g., an 8-inch (200 mm)) can be installed. In addition to the central axis or hub, the wire spool 1301 has an off-center bore 1303 in the approximate region of the central hub. This off-set bore 1303 is aligned with a protrusion or peg 1302 on a base 119 of the shaft body 109 to fix the rotational position of the wire spool 1301 to the shaft body 109. The protrusion or peg 1302 extends generally parallel to the shaft body 109, inhibiting rotation of spool 1301 are the shaft body 109 when the off-center bore 1303 is engaged with the peg 1302. Additionally, the braking force generated by the frictional engagement of the shaft body 109 against the friction washer 108 is transferred to the spool 1301 via the peg or protrusion 1302. Singular or multiple braking protrusions 1302 may be present on the base 119 of the shaft body 109.

Figure 14:
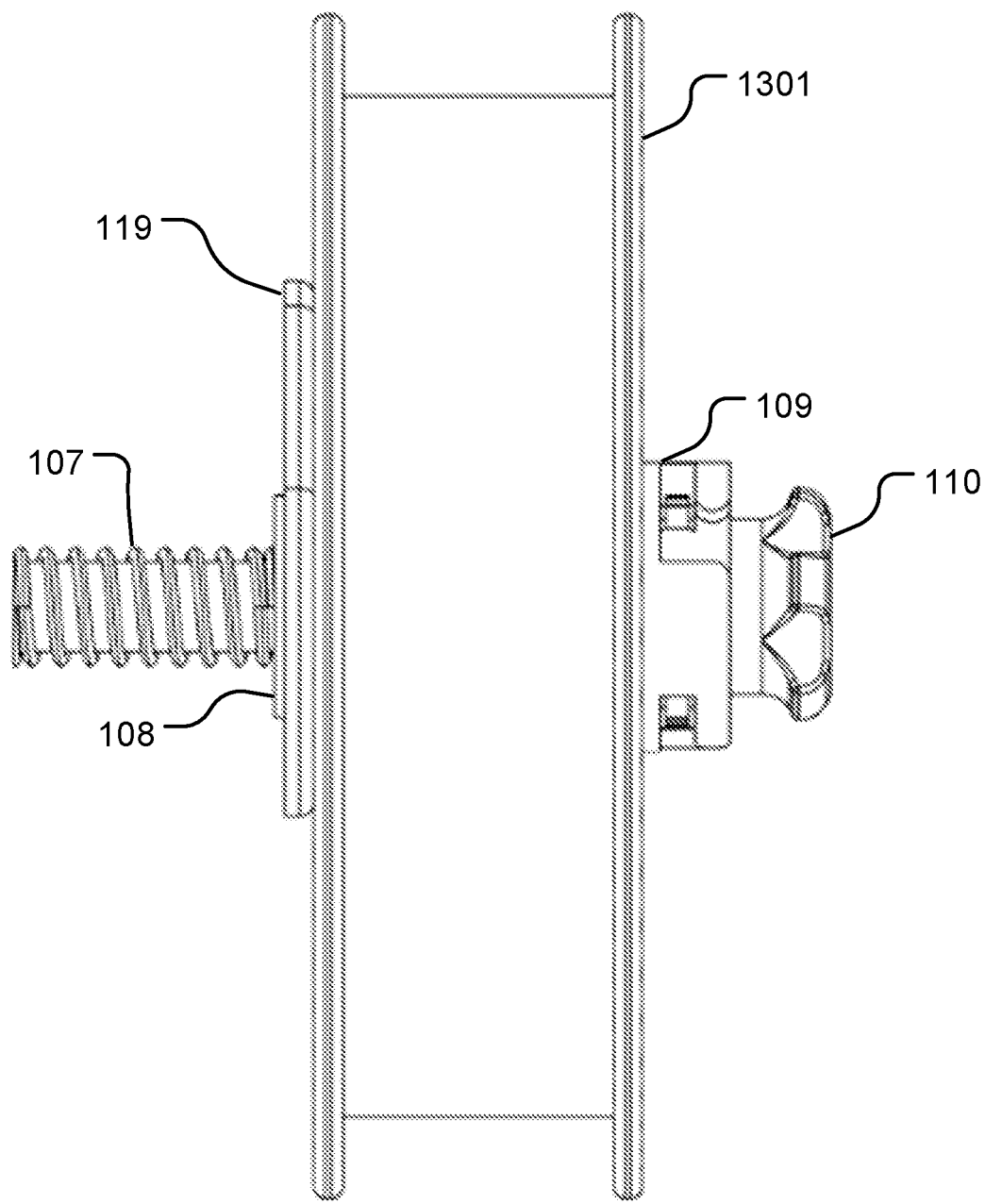
FIG. 14 is a side view of the portion of the second despooler with the wire spool mounted.
Figure 15:
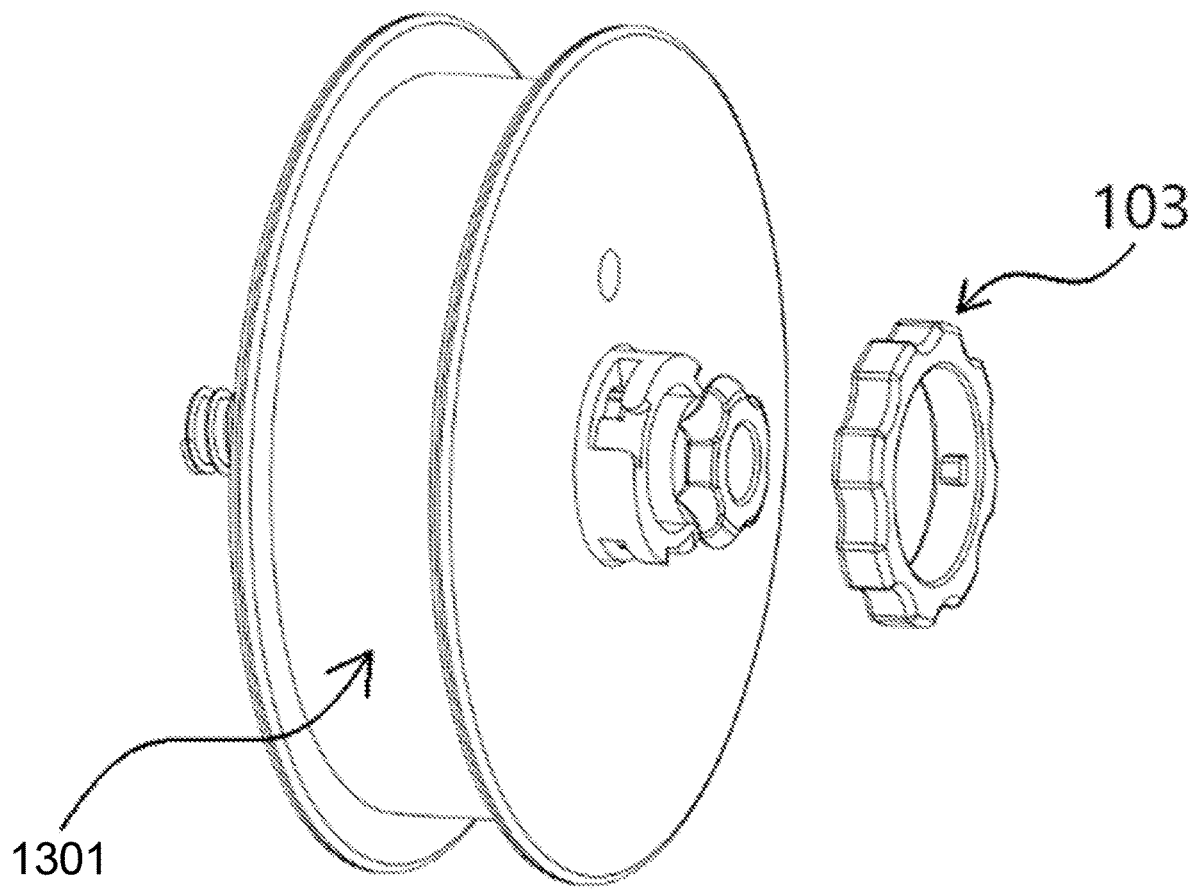
FIG. 15 is a perspective view of the second despooler with a mounted wire spool and a spool locking ring.
Figure 16:
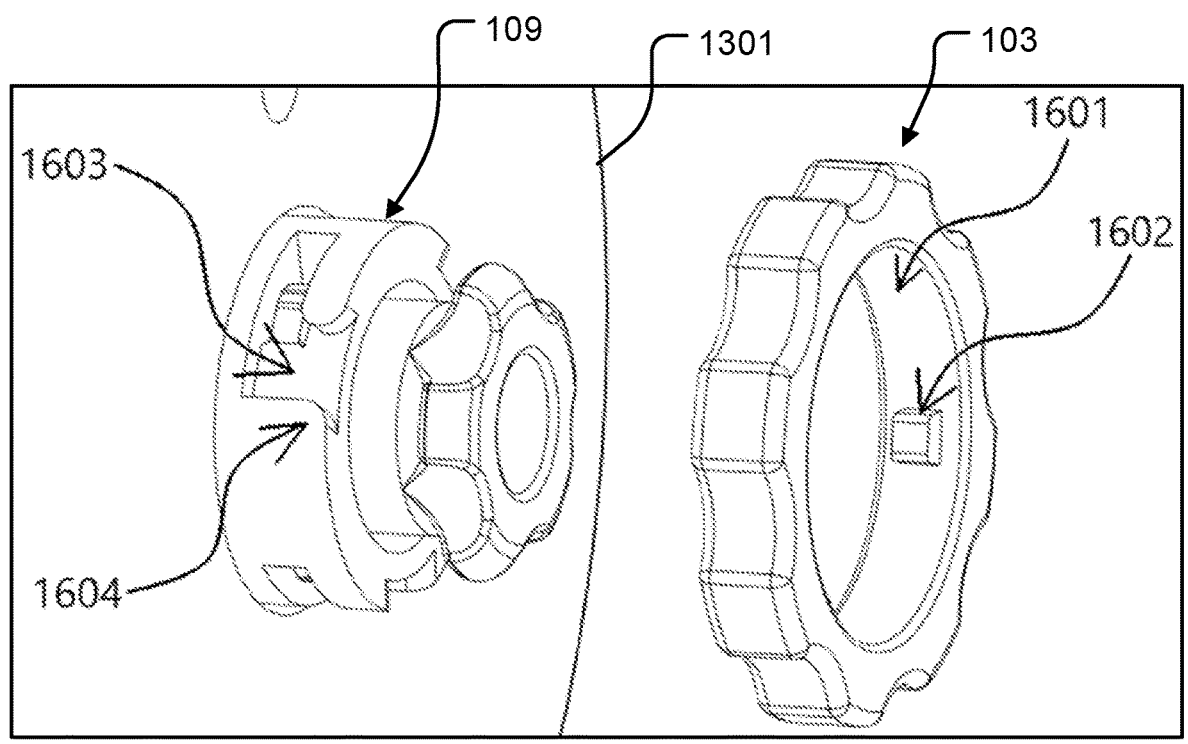
FIG. 16 is an enlarged perspective view of the mounted wire spool and the spool locking ring of the second despooler.

The wire spool 1301 (e.g., an 8 inch (200 mm) wire spool) on the despooler is shown in FIG. 14, with the tension lock 110, the tension spring 107 and the friction washer 108 called out, as well as the shaft body 109 and its base 119. After the spool 1301 is in place, the spool locking ring 103 can be installed, as shown in FIG. 15, thereby completing the assembly. FIG. 16 shows details of the locking ring 103 and its engagement with the tension lock 110.

The spool locking ring 103 is annular, having an internal surface 1601 with one or more protrusions 1602 extending therefrom, the protrusion extending inwardly from the internal surface 1601. The protrusion 1602 is configured to directly interact with locking keyways 1603 present in the distal end of the shaft body 109. The locking keyway 1603 has a terminal bend or corner, which may be at a right angle to the keyway 1603, that extends around the circumference of the shaft body 109, e.g., 5-180 degrees, to provide a quarter-turn or similar locking feature when the protrusion 1602 is received therein. The keyway 1603 can include a flared entrance 1604 to aid in the receiving of the protrusion 1602 therein. There is at least one keyway 1603 for each protrusion 1602.

To install the spool locking ring 103, the ring 103 is aligned centrally about the axis of rotation of the shaft body 109. Then the at least one protrusion 1602 of the locking ring 103 is aligned with the flared entrance 1604 of the keyway 1603 and pushed into the keyway 1603 toward the wire spool 1301. Once the protrusion 1602 reaches critical depth within the keyway 1603, the locking ring 103 can be rotated by, e.g., 5 to 180-degrees, so that the protrusion 1602 follows the bend in the keyway 1603.

Figure 17A:
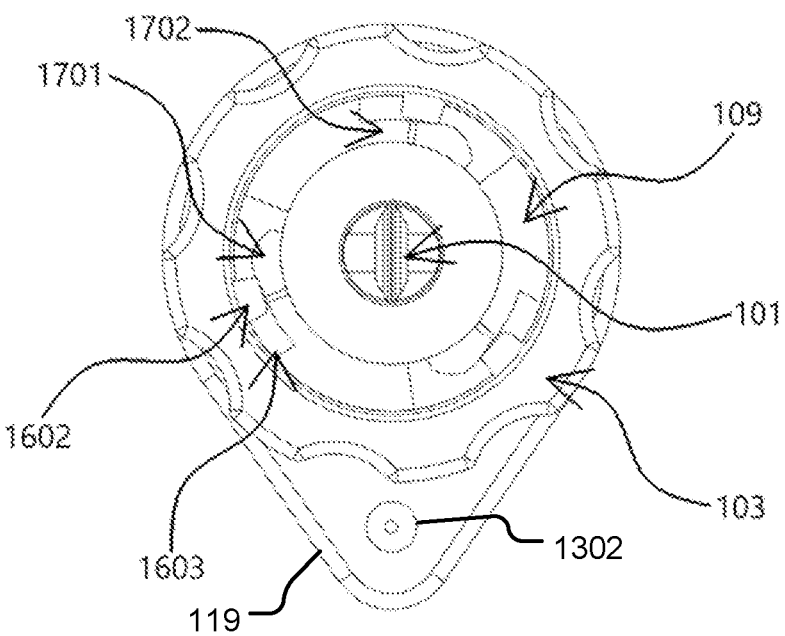
FIG. 17A is a plan view of the spool locking ring in a first position for the second despooler.
Figure 17B:
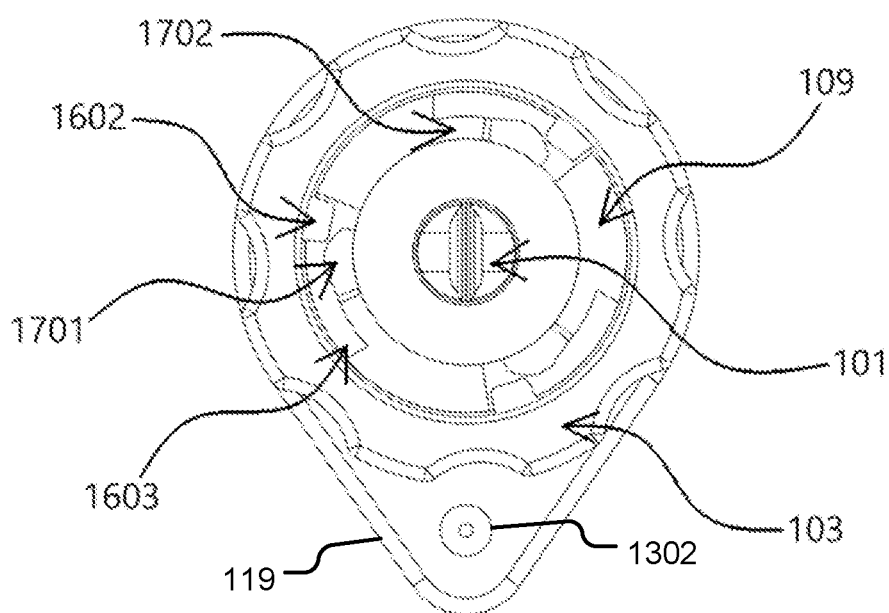
FIG. 17B is a plan view of the spool locking ring in a second position.
Figure 18:
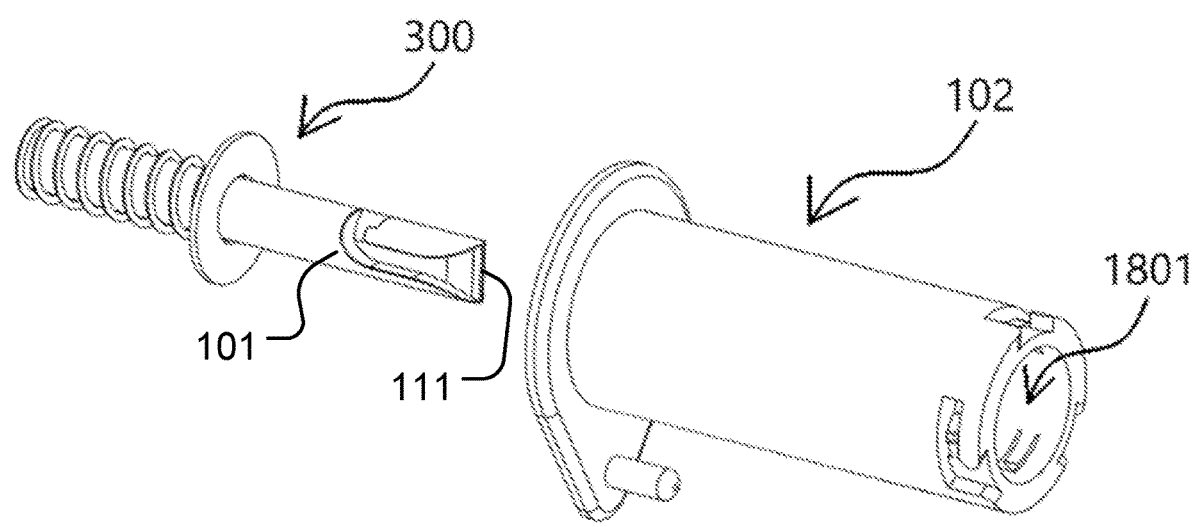
FIG. 18 is a perspective view of components for a third despooler.

During this rotation, the protrusion 1602 on the internal surface 1601 of the locking ring 103 may engage with a cam-like structure 1701 present within or about the lateral portion of the keyway 1603 in the shaft body 109, seen in FIGS. 17A and 17B. Particularly, FIG. 17A shows the locking ring 103 prior to engaging with the cam-like structure 1701 and FIG. 17B shows the locking ring 103 after engaging with the cam-like structure 1701.

The keyway 1603 in the shaft body 109 also includes at least one arm-like member 1702, extending radially from the shaft body 109. The length of the arm-like member 1702 is such that interaction between the protrusion 1602 and the cam-like structure 1701 causes tensile flexure or elastic displacement of the arm-like member 1702 orthogonal to the axis of rotation of the shaft body 109. The arm-like member 1702 remains in its displaced state as the protrusion 1602 continues to translate over or around the elevated cam-like structure during the rotation process.

As the locking ring 103 continues its partial rotation (FIG. 17A to FIG. 17B shows clockwise rotation), the protrusion 1602 moves across and completes its interaction with the cam-like structure 1701 and the radial arm-like member 1702. Also during the rotation, the protrusion 1602 additionally may move axially in relation to the shaft body 109 to a critical depth within the lateral portion of the keyway 1603.

The disengagement of the protrusion 1602 from the cam-like structure 1701 relieves the flexural stress exerted on the arm-like members 1702 by the protrusion 1602, thus allowing the cam-like structure 1701 to return to its original un-displaced position within the shaft body 109. This effectively captures the locking ring 103 in place, therefore inhibiting axial translation of the wire spool, being captured on either end by the base of the shaft body 109 and the locking ring 103, respectively.

Disassembly of the despooler and removal of the spool simply encompasses the reversal of the previously discussed operations.

The previous figures, FIGS. 9 through 17A and 17B, and the discussion above, have shown and described the construction and use of a second despooler made with the components from the set 100 shown in FIG. 1, the despooler configured for, e.g., an 8 inch (200 mm) wire spool.

FIGS. 18 through 25 and the discussion below show and describe the construction and use of a third despooler made with components shown in FIG. 1, the despooler configured for, e.g., a 12 inch (300 mm) wire spool.

As with the second despooler, the same completed shaft assembly 300 as from the first despooler and the second despooler (formed from the shaft 101, the tension spring 107, the friction washer 108, etc.) is used for this third despooler. The first shaft body 102 (for this third despooler) is installed onto the shaft assembly 300, particularly over the distal end 111 of the shaft 101, so that the shaft 101 passes through a central bore 1801 of the shaft body 102. A proximal central bore (not seen in the figures) may be present in the proximal end of the shaft body 102, (i.e., the end closest to the friction washer 108, when assembled), for reasons discussed later below. The shaft body 102 also includes at least one locking mechanism that provides a quarter-turn or similar locking features, additional details of which are provided below. The third shaft body 102 acts as an adapter for certain size spools (e.g., 12-inch spools) to allow certain spool hubs (much larger than that of the wire spool 401) to be centrally mounted about their axis of rotation onto the completed shaft assembly 300.

Figure 19:
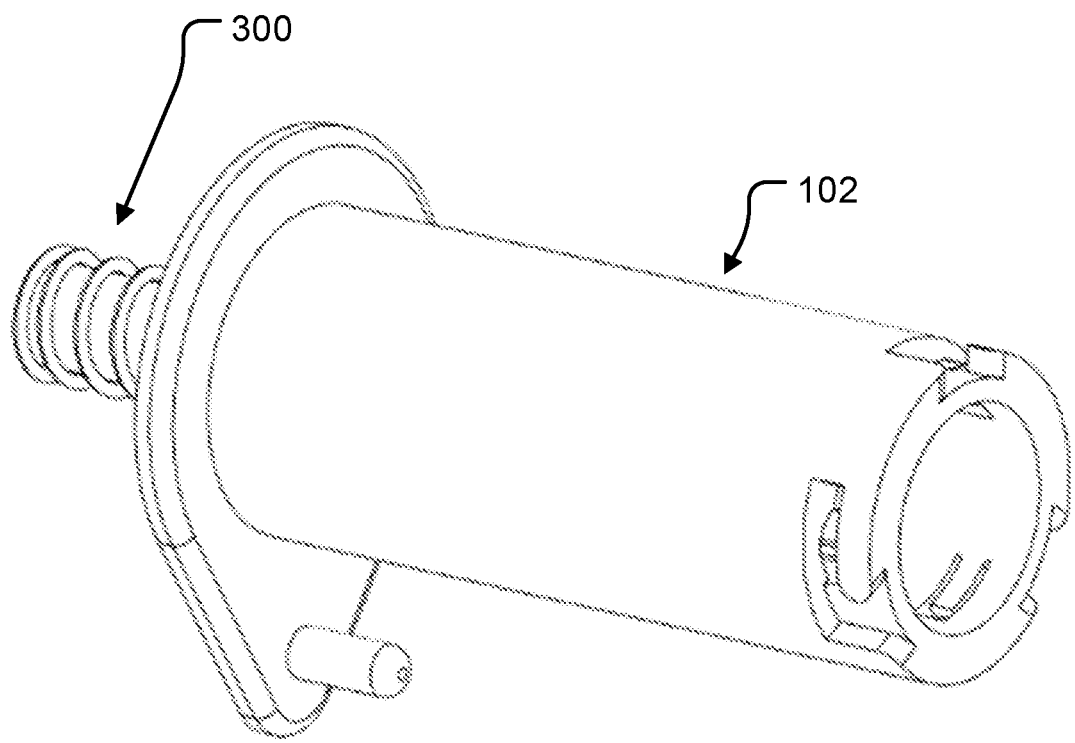
FIG. 19 is an enlarged perspective view of a portion of the third despooler.
Figure 20:
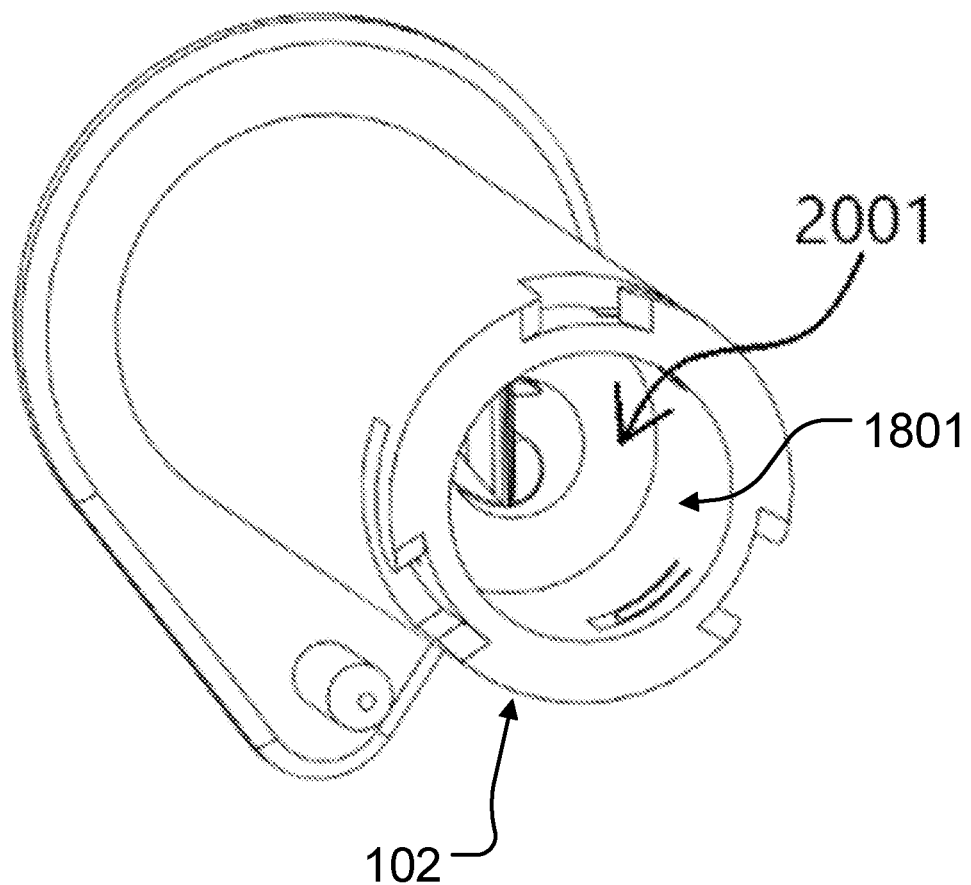
FIG. 20 is a perspective end view of a portion of the third despooler.

FIG. 19 shows the shaft body 102 in place on the shaft assembly 300. FIG. 20 also shows that the shaft body 102 has a flat face 2001 within the bore 1801.

With the shaft body 102 in place on the shaft assembly 300, the tension lock 110 can be installed on the end of the shaft 101 in a similar manner as described above and below.

Figure 21:
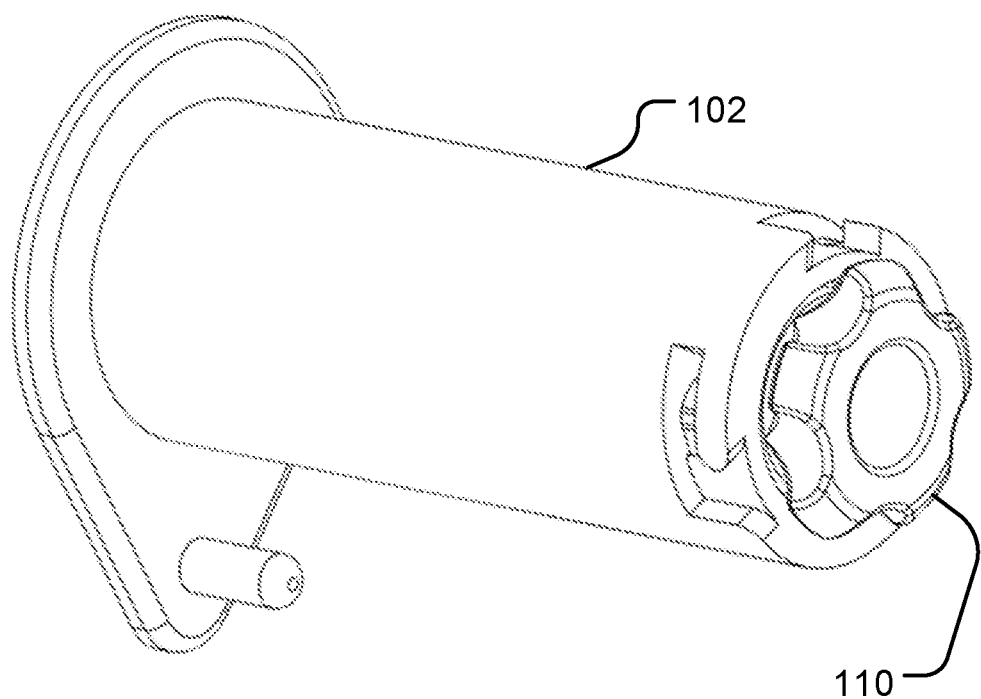
FIG. 21 is a perspective view of the portion of the third despooler with a tension lock.

As the tension lock 110 is pressed onto the shaft 101 by the user, the open end 602 of the tension lock 110, which can include a flat face, will contact and abut the face 2001 within the bore 1801, thus forcing the shaft body 102 into contact with the friction washer 108. When this contact is established, the tension spring 107, pressed between the despooler mounting surface or plate 201 and the friction washer 108, compresses. When at least one peg 601 of the tension lock 110 reaches some critical depth (which may or may not be the same depth achieved in the case of the first despooler and the second despooler) within the trackway 701 of the shaft 101, it encounters the curve 703 of the trackway 701 that provides a partial rotation (e.g., from 10 to 90-degrees) of the tension lock 110. Once this rotation is completed and the pressure applied to the tension lock 110 is released, force from the tension spring 107 urges the peg 601 against the tab 704, capturing the tension lock 110 in place. FIG. 21 shows the tension lock 110 in place on the shaft body 102.

As with the previous despoolers, a threaded engagement may be used with or in place of the non-threaded and/or quarter-turn locking feature described above.

Figure 22:
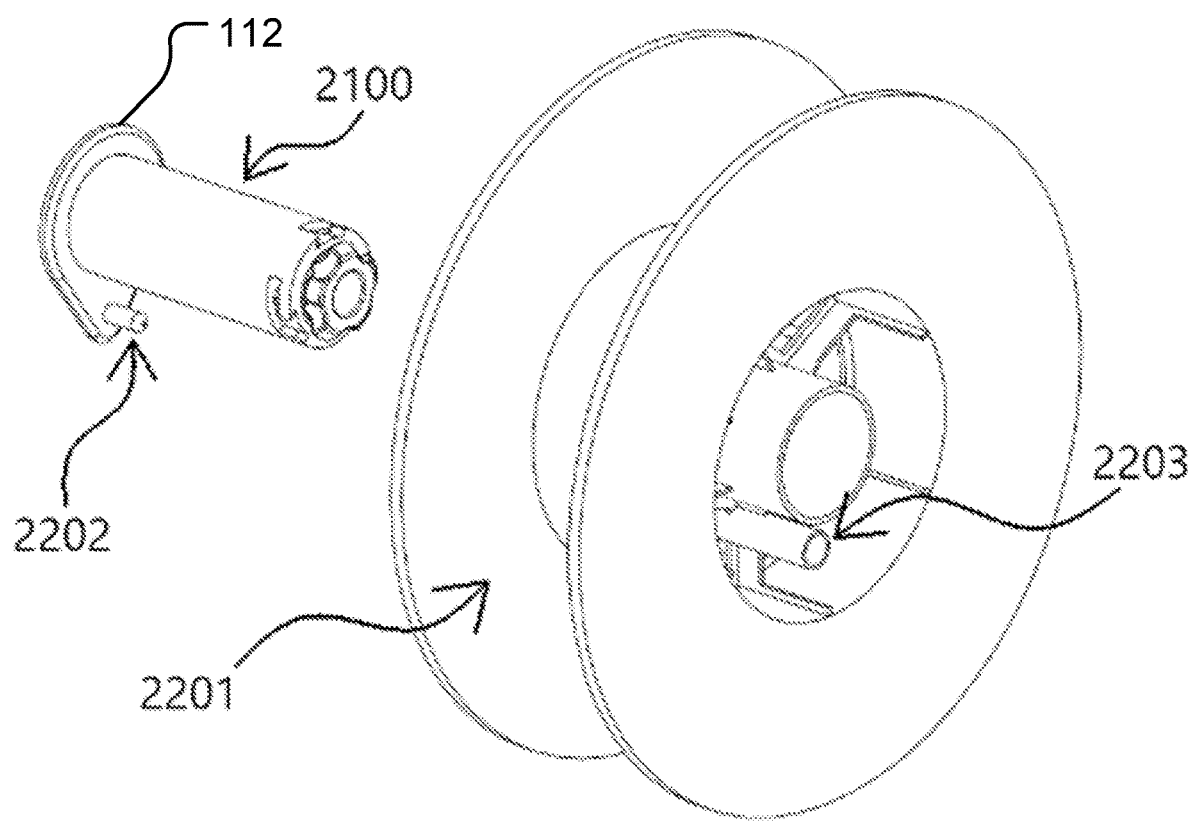
FIG. 22 is a perspective view of the portion of the third despooler with a wire spool.

With the shaft body 102 and the tension lock 110 in place, a wire spool 2201 (e.g., 12-inch (300 mm)) can be installed; see FIG. 22. In addition to the central axis or hub, the wire spool 2201 has an off-center bore 2203 in the approximate region of the central hub. This off-set bore 2203 is aligned with a protrusion 2202 on the base 112 of the shaft body 102 to fix the rotational position of the wire spool 2201 to the shaft body 102. Additionally, the braking force generated by the frictional engagement of the shaft body 102 against the friction washer 108 is transferred to the spool 2201 via the protrusion 2202. Singular or multiple braking protrusions 2202 may be present on the base 112 of the shaft body 102.

Figure 23:
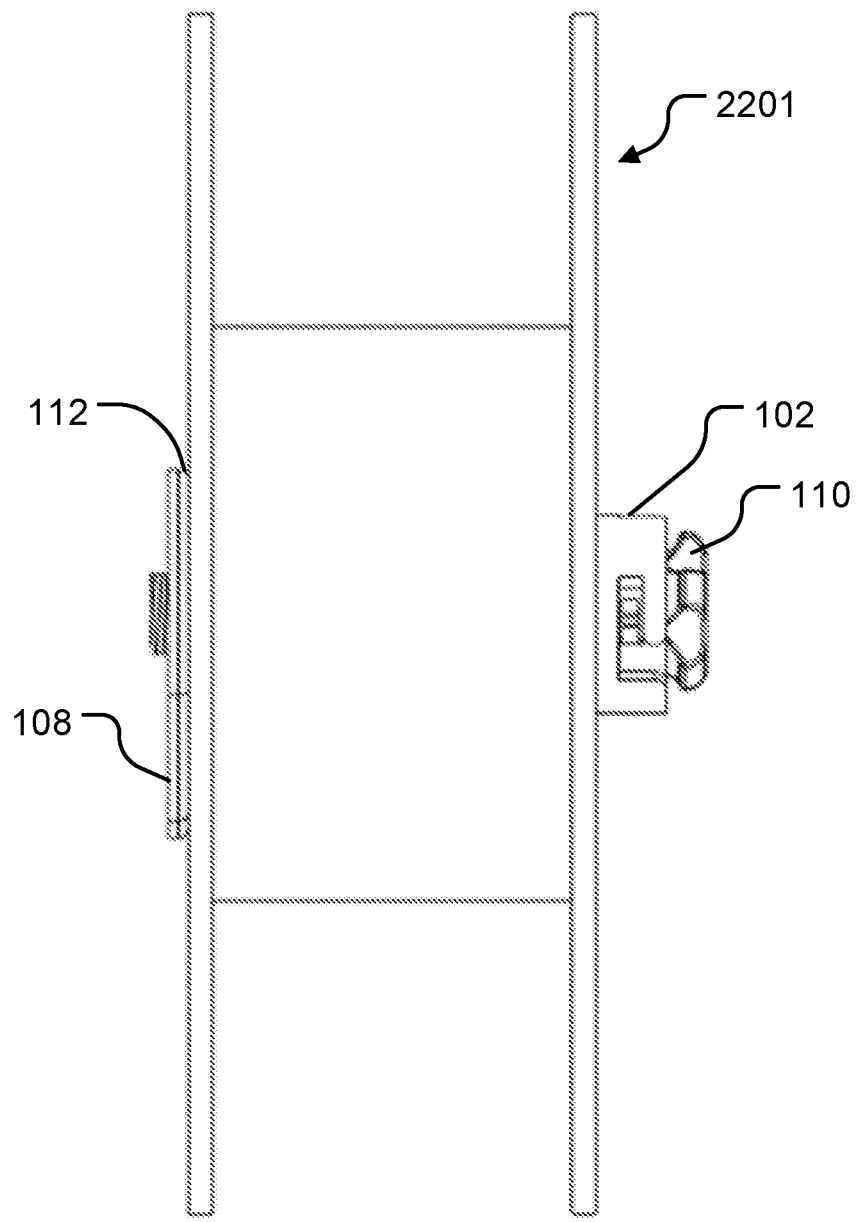
FIG. 23 is a side view of the portion of the third despooler with the wire spool mounted.

FIG. 23 shows the spool 2201 mounted on the shaft body 102.

Figure 24:
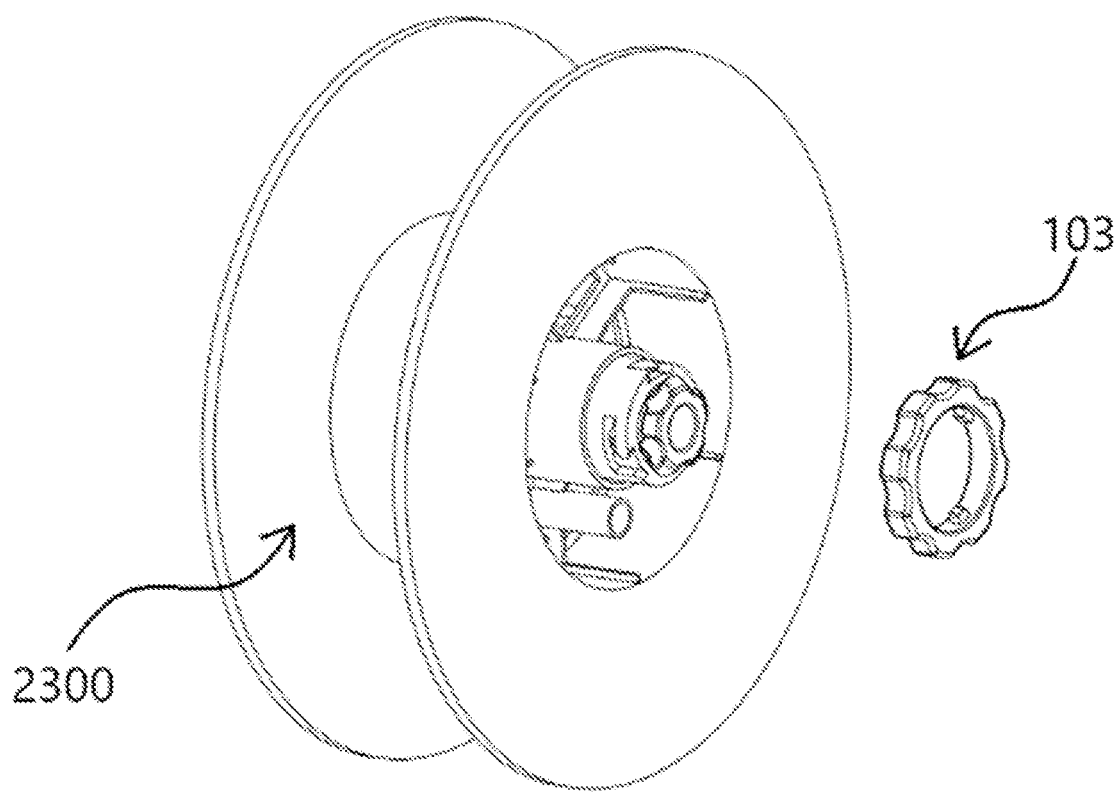
FIG. 24 is a perspective view of the third despooler with a mounted wire spool and a spool locking ring.
Figure 25:
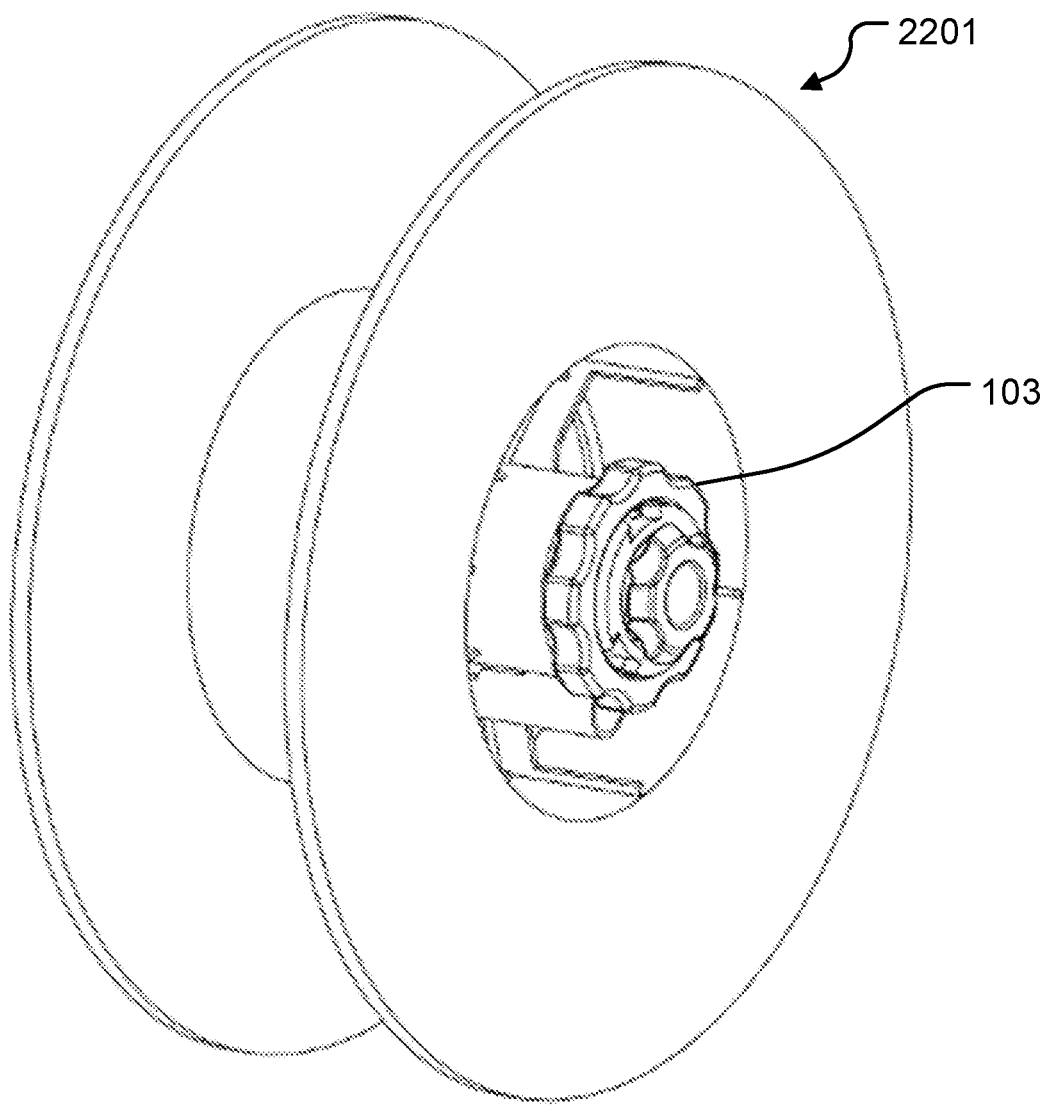
FIG. 25 is an enlarged perspective view of the mounted wire spool and the spool locking ring of the third despooler.

Once the spool 2201 is in place on the shaft body 102 and the off-set bore 2203 and the protrusion 2202 are aligned, the locking ring 103 can be installed, as described above in respect to the second despooler. FIG. 24 illustrates the locking ring 103 aligned to be engaged with the shaft body 102, and FIG. 25 shows the locking ring 103 engaged. With the locking ring 103 in place, axial translation of the wire spool 2201 is inhibited, due to it being positioned between the base 112 of the shaft body 102 and the locking ring 103.

Summarized, provided herein above is a discussion as to how three different despoolers can be assembled, for different size wire spools, from the components shown in the set 100 of FIG. 1. In general, the basic structure of the three despoolers is the same, with different sized shaft bodies and a locking ring being used for the larger despoolers.

As discussed previously, the spring tension that generates the braking force to stop the rotation of the spool when the weld is terminated by the user is generally set arbitrarily in prior despoolers based on several factors; these factors include, but are not limited to, the size (e.g., diameter and width) of the welding wire spool and the desired braking force as determined by operator experience, etc. The despoolers of this disclosure allow for no variability in the magnitude of spool tension as applied by the user to each spool size.

Traditional despoolers generally offer no indication in reference to the amount of tension required for specific spool sizes or classifications. There are also generally no indicators in reference to the amount of tension present on the spring. This often leads to difficulty and confusion on the part of the user. The despoolers of this disclosure automatically set the tension for the appropriate size wire spool.

Wire-feed stability is critical for consistent weld performance and functionality, and despooler tension directly impacts this stability. If the braking force of the despooler is set too low by the user, the welding wire spool will continue to rotate under its own angular momentum when the weld is terminated by the user. This generally results in several coils of wire unfurling from the remainder of the tightly wound spool before it eventually comes to a complete stop. As the wire-feed is reinitiated by the user, these unfurled coils will be directly acted upon by the pulling force presented by the wire-feed mechanism. This pulling force will generally tighten the unfurled coils, allowing some amount of wire to pass through the wire-feed mechanism before the spool begins to rotate. Finally, once the previously unfurled coils are tightened around the remainder of the spool, the pulling force presented by the wire-feed mechanism will cause the spool to jerk into rotation. This places a sudden strain on the wire-feed mechanism resulting in wire-feed instability and lag.

Conversely, the more force exerted on the spool by the despooler opposing rotation and wire-feed, the harder the wire-feed mechanism must work to overpower this force. A simple energy balance (taking the welding machine or power supply as a closed system) shows that as more power is consumed by the wire feed mechanism to overcome the braking force of the spool holder, less power is available for the welding output. Therefore, too much braking force will cause welding performance to degrade.

An optimum spool tension exists for each welding wire spool size (the common sizes being 4-inch, 8-inch, and 12-inch.) The despoolers described herein apply the optimum spool tension settings for each of the spool sizes. The non-threaded engagement of the spool to the shaft or shaft body inhibits the ability for the user to apply inadequate tension (under-tension) or excessive tension (over-tension).

To obtain the desired tension setting for each of the despoolers, certain components have specific properties. The tension spring 107, used for each of the three despoolers, has a known loading rate, K (lb/in or kg/m). The braking force generated by the compression of the spring 107 for each of the three assembly setups can be precisely calibrated by controlling the distance the free end of the spring is displaced during the tensioning process. During assembly of each of the three despoolers, the spring 107 is placed on the shaft 101 between the despooler mounting surface or plate 201 and the friction washer 108. In its uncompressed state, starting with one end coincident to the surface 201 and the opposite end coincident to the friction washer 108, the remainder of the components for each setup are not installed unless the spring 107 is compressed to some critical length.

When the tension lock 110 is affixed to the end of the shaft 101, the flat face of the tension lock 110 must displace either the spool itself (spool 401) in the case of the 4-inch despooler setup, or the shaft body (shaft body 102 or shaft body 109, respectively, in the case of the 8-inch and 12-inch despooler setups) by some pre-defined distance along the central axis of the despooler. This displacement occurs such that the internal peg 601 of the tension lock 110 can be captured by the trackway tab 704 of the shaft 101. The magnitude of this displacement can be controlled by the distance from the despooler mounting surface or plate 201 to the peg capturing tab 704 of the shaft 101 in the case of the 4-inch despooler setup, or the position along the axis of the shaft 101 at which the friction washer 108 makes contact with the shaft bodies 102 and 109, respectively, in the case of the 8-inch and 12-inch setups. This displacement is directly translated into the compression of the spring 107.

By controlling the distances, depths, and locations at which component-to-component interaction occurs during the design, validation, and manufacturing process of the components, the despooler automatically applies optimized and individualized spring tension and therefore braking force to each spool size respectively during each of the three assembly processes.

Figure 26:
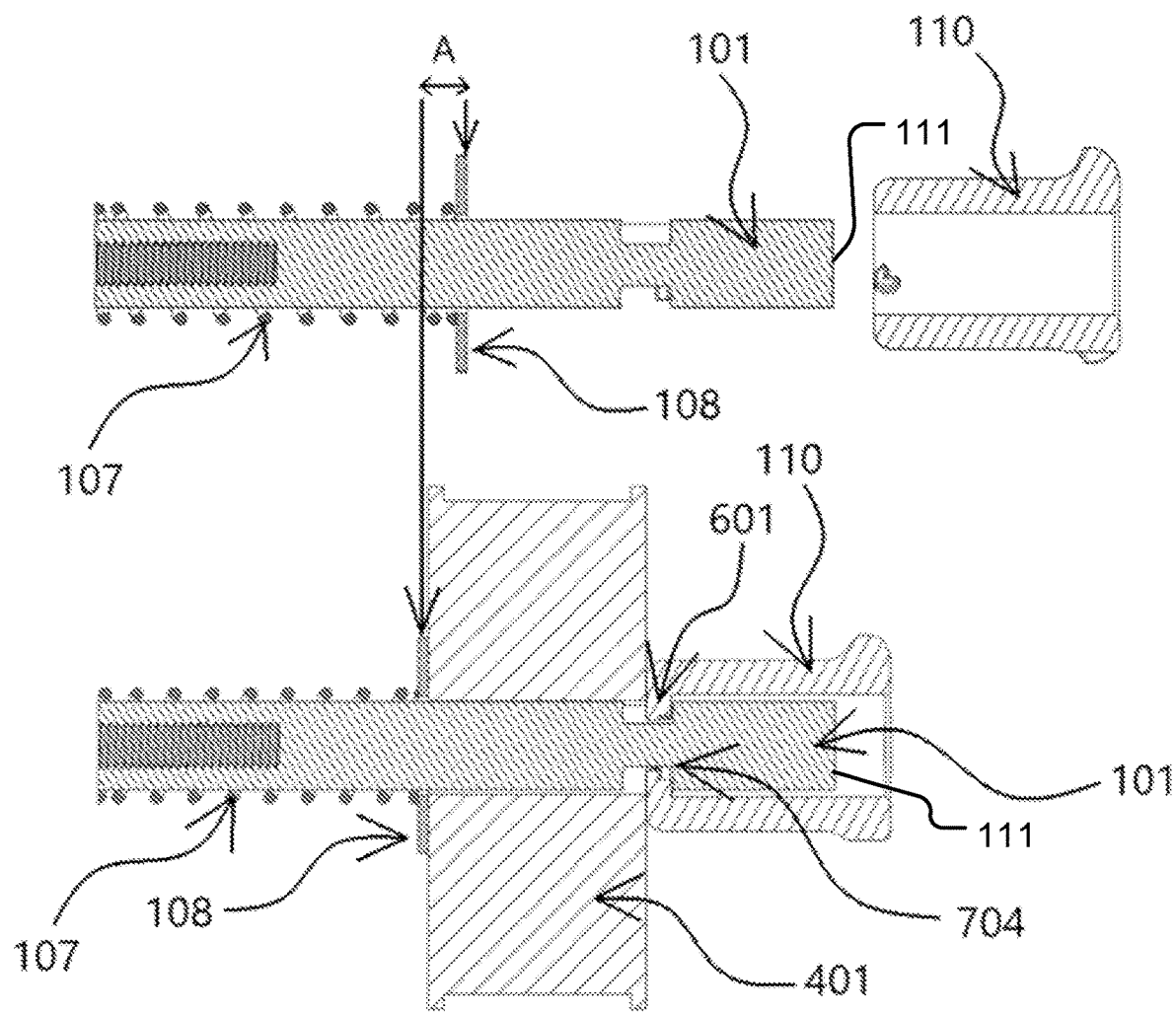
FIG. 26 is a side view of the first despooler in an uncompressed orientation (top image) and in a compressed orientation (bottom image).
Figure 27:
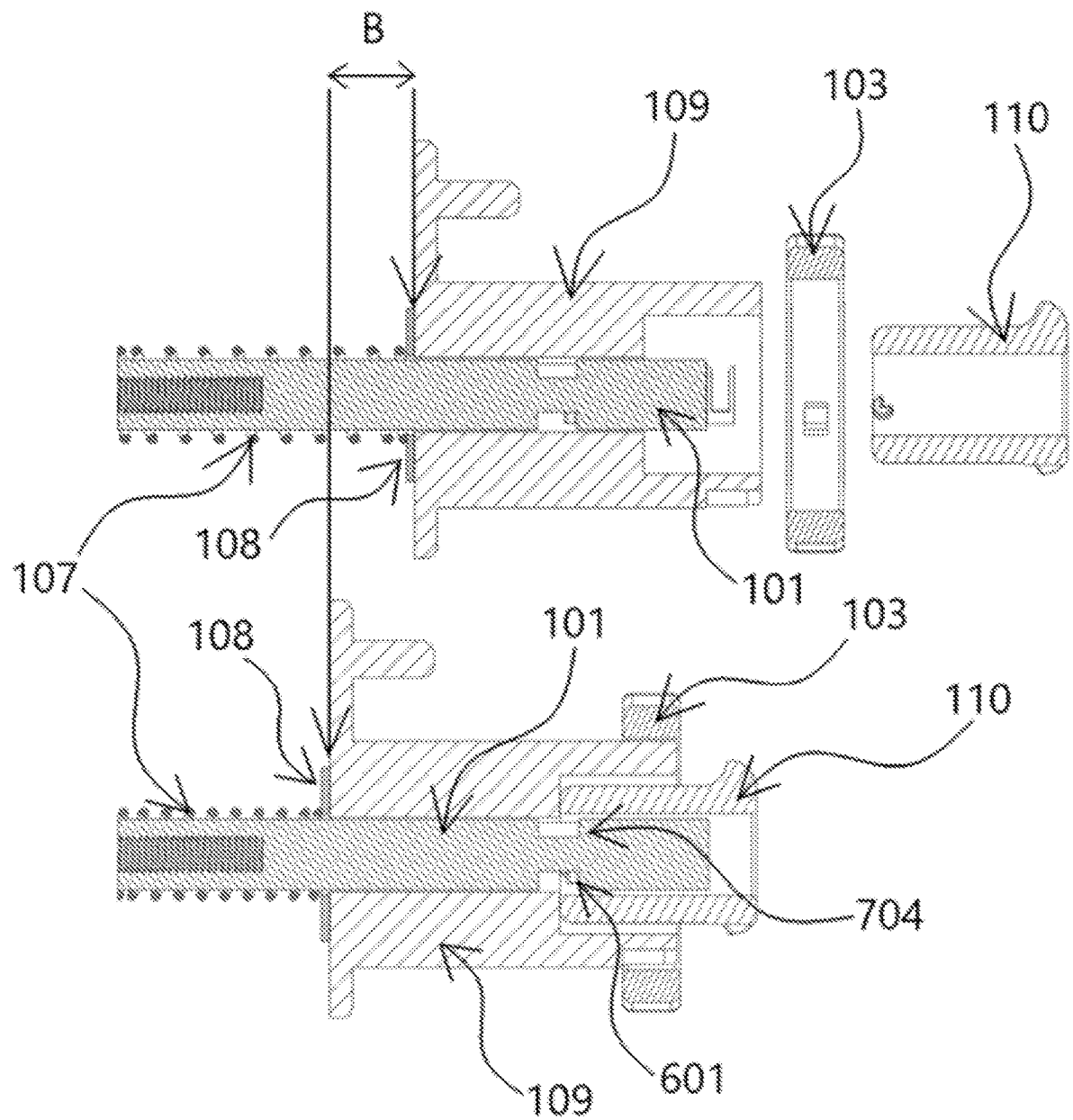
FIG. 27 is a side view of the second despooler in an uncompressed orientation (top image) and in a compressed orientation (bottom image).
Figure 28:
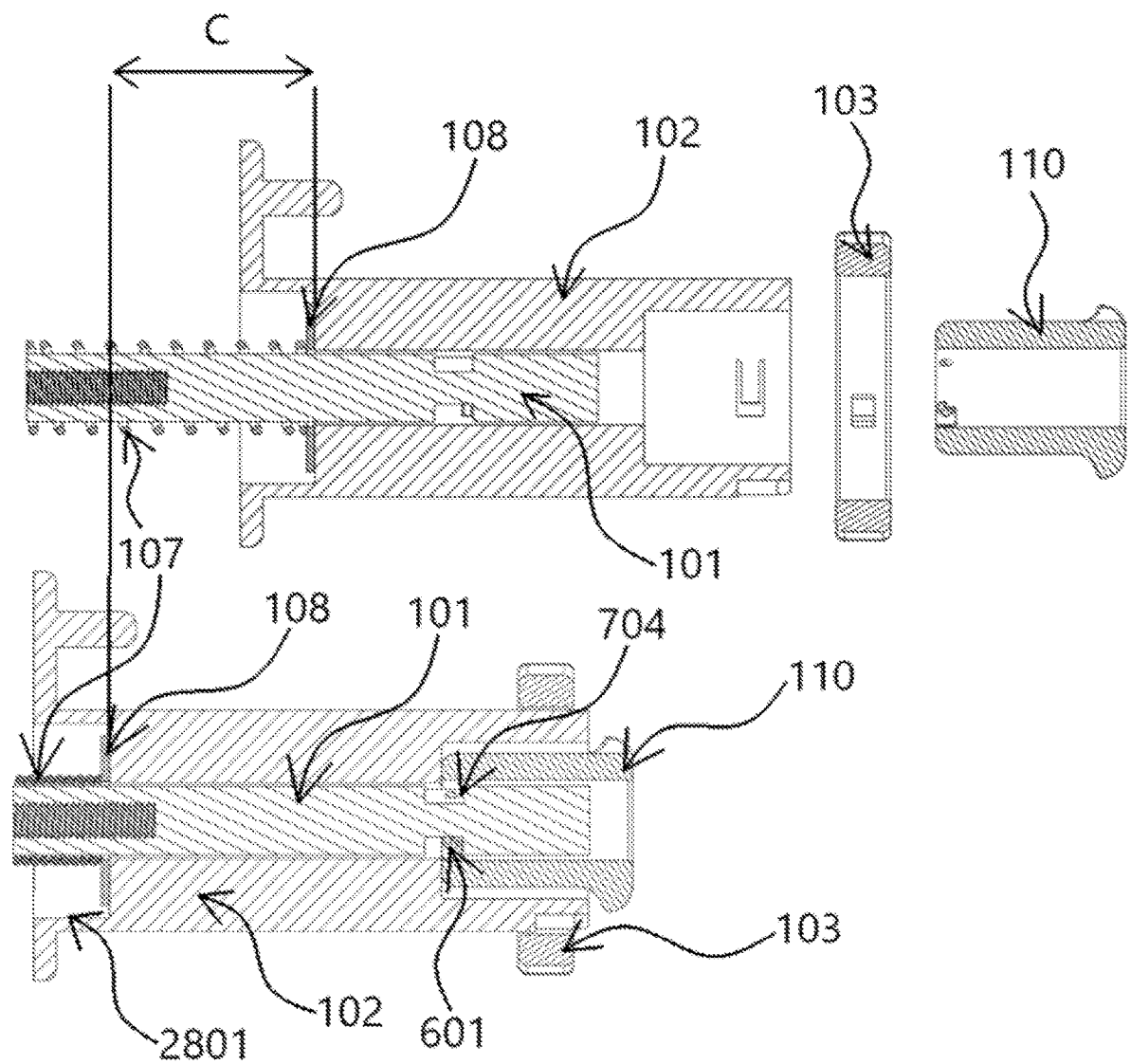
FIG. 28 is a side view of the third despooler in an uncompressed orientation (top image) and in a compressed orientation (bottom image).

The three despoolers are shown in detail in FIGS. 26 to 28 in their respective compressed and uncompressed states, the first despooler in FIG. 26, the second despooler in FIG. 27, and the third despooler in FIG. 28. Once any of these despoolers is assembled, regardless of the assembly setup (be it for the 4-inch, 8-inch, or 12-inch despooler), the tension lock 110 is always in the same position in reference to the shaft 101 and the despooler mounting surface or plate 201. This provides a fixed datum from which the compression distance of the spring can be designed and evaluated.

FIG. 26 shows the first despooler (for a, e.g., 4-inch wire spool) in an uncompressed (top image) and compressed (bottom image) orientation, with the wire spool 401 mounted thereon.

FIG. 26 shows the free face of the friction washer 108 in closer proximity to the distal end 111 of the shaft 101 with respect to the despooler mounting surface 201 (not shown in FIG. 26.) when the despooler setup is in its uncompressed state. After the wire spool 401 is placed in position on the shaft 101, the tension lock 110 is installed via the method discussed above.

By comparing the top image (uncompressed stated) to the bottom image (compressed state), it can be seen that installing the tension lock 110 compresses the tension spring 107 by a distance "A". This distance A is based on the thickness (width) of the wire spool 401, in this embodiment a 4-inch welding wire spool, and the uncompressed length of the spring 107. When compressed to this distance, the spring 107 develops at or around the optimum tension for 4-inch welding wire spools.

FIG. 27 shows the second despooler (for an, e.g., 8-inch wire spool) in an uncompressed (top image) and compressed (bottom image) orientation By comparing the top image (uncompressed stated) to the bottom image (compressed state), it is seen that the face of the friction washer 108 that makes contact with the shaft body 109 is closer in proximity to the cantilever end of the shaft 101 with respect to the despooler mounting plate 201 (not shown in FIG. 27) when this despooler setup is in its uncompressed state. After the shaft body 109 is placed in position on the shaft 101, the tension lock 110 is installed via the method discussed above.

By comparing the top image (uncompressed stated) to the bottom image (compressed state), it is seen that installing the tension lock 110 compresses the tension spring 107 by a distance "B". This distance B is based on the length of the shaft body 109 and the uncompressed length of the spring 107. When compressed to this distance, the spring 107 develops at or around the optimum tension for an 8-inch welding wire spool.

It is noted that when comparing to the first despooler setup of FIG. 26, the compression distances A and B are individualized based on respective spool sizes, and thus A and B are not the same (i.e., B A).

FIG. 28 shows the third despooler (for a, e.g., 12-inch wire spool) in an uncompressed (top image) and compressed (bottom image) orientation.

By comparing the top image (uncompressed state) to the bottom image (compressed state), it is seen that the face of the friction washer 108 that makes contact with the shaft body 102 is closer in proximity to the distal end 111 of the shaft 101 with respect to the despooler mounting surface 201 (not shown in FIG. 28) when the despooler setup is in its uncompressed state. After the shaft body 102 is placed in position on the shaft 101, the tension lock 110 is installed via the method discussed above.

By comparing the top image (uncompressed stated) to the bottom image (compressed state), it is seen that installing the tension lock 110 compresses the tension spring 107 by a distance "C". This distance C is based on the thickness of the shaft body 102 and the uncompressed length of the spring 107. A proximal central bore 2801 may be present in the shaft body 102 to aid in achieving the desired spring compression distance. When compressed to this distance C, the spring 107 develops at or around the optimum tension for a 12-inch welding wire spool.

It is noted that when comparing to the first despooler setup of FIG. 26 and to the second despooler setup of FIG. 27, the compression distances A and B and C are individualized based on respective spool sizes, and thus A and B and C are not the same (i.e., C B A).

During the wire-feed welding process, proper spool alignment affects the wire-feed stability, which in turn affects weld performance and functionality. All three of the despoolers assembled from the components of the set 100 of FIG. 1 provide a centralized and/or optimized spool alignment of the wire about the wire-feed mechanism of the welding machine or power supply regardless of spool size.

Figure 29:
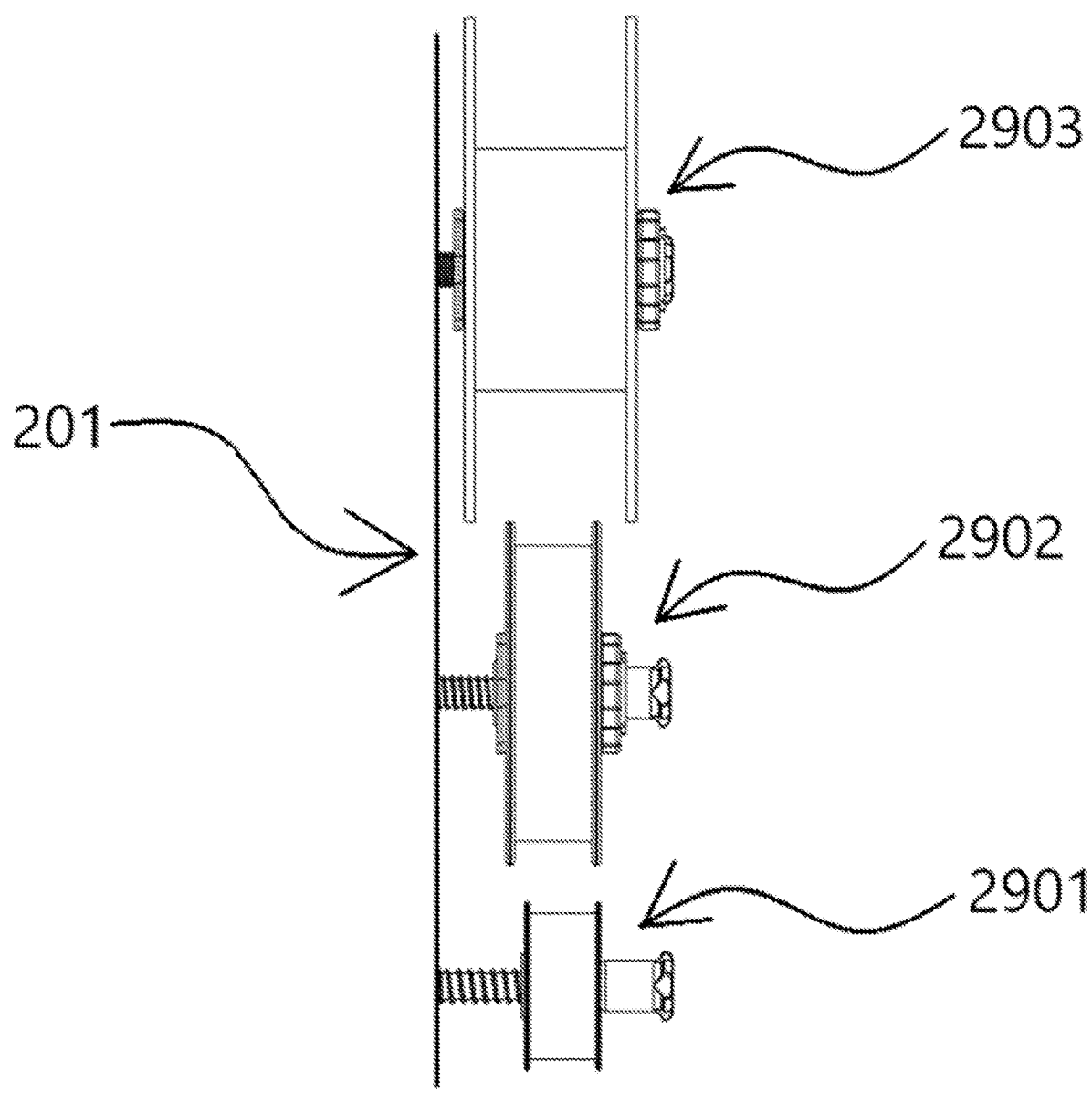
FIG. 29 is a side view of three different examples of despooler setups illustrating their relative central spool alignment.

FIG. 29 illustrates that the respective locations of component-to-component interaction before and after spring compression for the three despoolers, the first despooler shown with a 4-inch wire spool as assembly 2901, the second despooler shown with an 8-inch wire spool as assembly 2902, and the third despooler shown with a 12-inch wire spool as assembly 2903. All three assemblies 2901, 2902, 2903 are shown mounted to the supporting surface or plate 201. As seen in FIG. 29, the axial centers of the three spools are approximately aligned.

For each of the three assemblies 2901, 2902, 2903, the braking tension is set by the user engaging the tension lock 110; no adjustment or manipulation is needed by the user to adjust the braking tension, due to the non-threaded configuration of the tension lock 110 and the trackway 701 in the shaft 101 with which it engages. Additionally, the tension lock 110 effectively positions the respective spool centrally about the wire-feed mechanism of the welder or power supply.

For ease of assembly and use on behalf of the operator, the different components of the set 100 may be labeled, color coded, or otherwise display various other visual indicators such that components clearly indicate proper assembly order and grouping requirements for each of the three despooler setups. Components, such as, e.g., the tension spring 107 and shaft 101, which are used in all versions of the despoolers, may not be marked or may be marked to indicate that the component is used in all versions.

The various components or parts of the despoolers and variations thereof may be formed of any suitable material, including metal (e.g., iron, steel), composite materials (e.g., carbon fiber), ceramics, polymeric materials, and any combination thereof. Any of the components or parts may have a coating thereon to, e.g., decrease surface friction, increase durability and decrease physical wear, increase chemical resistance, etc.

The above specification and examples provide a complete description of the structure and use of exemplary implementations of the invention. The above description provides specific embodiments. It is understood that other implementations and embodiments are contemplated and may be made without departing from the scope or spirit of the present disclosure. The above detailed description, therefore, is not to be taken in a limiting sense. While the present disclosure is not so limited, an appreciation of various aspects of the disclosure will be gained through a discussion of the examples provided.

Unless otherwise indicated, all numbers expressing feature sizes, amounts, and physical properties are to be understood as being modified by the term "about," whether or not the term "about" is immediately present. Accordingly, unless indicated to the contrary, the numerical parameters set forth are approximations that can vary depending upon the desired properties sought to be obtained by those skilled in the art utilizing the teachings disclosed herein.

As used herein, the singular forms "a", "an", and "the" encompass implementations having plural referents, unless the content clearly dictates otherwise. As used in this specification and the appended claims, the term "or" is generally employed in its sense including "and/or" unless the content clearly dictates otherwise.

Spatially related terms, including but not limited to, "bottom," "lower", "top", "upper", "beneath", "below", "above", "on top", "on," etc., if used herein, are utilized for ease of description to describe spatial relationships of an element(s) to another. Such spatially related terms encompass different orientations of the device in addition to the particular orientations depicted in the figures and described herein. For example, if a structure depicted in the figures is turned over or flipped over, portions previously described as below or beneath other elements would then be above or over those other elements.

What is claimed:

1. A wire spool despooler assembly set, the set comprising:
   a shaft having a distal end and a proximal end;
   a compressible tension spring configured to be received axially on the shaft between the distal end and the proximal end;
   a tension lock configured to be received on the distal end of the shaft;
   a first shaft body having a length;
   a second shaft body having a length greater than the first shaft body length; and
   a locking ring configured to be received on the first shaft body and the second shaft body, wherein:
   a first despooler comprises the shaft, the tension spring and the tension lock;
   a second despooler comprises the shaft, the tension spring, the first shaft body, the tension lock and the locking ring; and
   a third despooler comprises the shaft, the tension spring, the second shaft body, the tension lock and the locking ring.

2. The despooler assembly set of claim 1 further comprising a washer configured to be received axially on the shaft between the tension spring and the distal end of the shaft.

3. The despooler assembly set of claim 2, wherein the washer is integral with the tension spring.

4. The despooler assembly set of claim 1, wherein the shaft has a trackway with a turn having an angle from 10 to 90 degrees.

5. The despooler assembly set of claim 1, wherein the second shaft body has a length about 4 inches longer than the first shaft body length.

6. The despooler assembly set of claim 1, wherein the locking ring has inward protrusions configured to engage with a keyway in the first shaft body and with a keyway in the second shaft body.

7. The despooler assembly set of claim 6, wherein each of the keyway in the first shaft body and the keyway in the second shaft body includes turn extending 5 to 180 degrees along a circumference of the shaft body.

8. The despooler assembly set of claim 1, wherein the first shaft body has a base with a peg extending therefrom, the peg parallel to the first shaft body.

9. The despooler assembly set of claim 1, wherein the second shaft body has a base with a peg extending therefrom, the peg parallel to the second shaft body.

10. The despooler assembly set of claim 1, wherein:
    the first despooler is configured to retain a 4 inch wire spool;
    the second despooler is configured to retain an 8 inch wire spool; and
    the third despooler is configured to retain a 12 inch wire spool.

11. A wire spool despooler comprising:
    a shaft having a distal end, with a trackway extending along the shaft from the distal end and having a terminal turn extending around the shaft about 10 to 90 degrees from the trackway;
    a compressible tension spring configured to be received axially on the shaft between the distal end and a proximal end of the shaft;
    a tension lock having an internal bore with at least one radially inward extending post configured to be received in the trackway; and
    a shaft body configured to be axially aligned and received on the shaft and a locking ring configured to be engaged with the shaft body.

12. The wire spool despooler of claim 11, the terminal turn of the trackway further having a tab extending away from the distal end.

13. The wire spool despooler of claim 11, the trackway having a flared entrance at the distal end of the shaft.

14. The wire spool despooler of claim 11, the shaft body having a keyway and the locking ring having at least one inward protrusion configured to engage with the keyway.

15. The wire spool despooler of claim 14, wherein the keyway has a terminal turn extending 5 to 180 degrees around the shaft body.

16. A wire spool despooler comprising:
    a shaft having a distal end and a proximal end, with a trackway extending along the shaft from the distal end and having a terminal turn extending around the shaft about 10 to 90 degrees from the trackway;
    a compressible tension spring configured to be received axially on the shaft between the distal end and the proximal end; and a tension lock having an internal bore configured to be received on and engaged with the distal end of the shaft in a non-threaded manner, the tension lock having at least one radially inward extending post configured to be received in the trackway.

17. The wire spool despooler of claim 16 further comprising a washer received axially on the shaft between the tension spring and the distal end of the shaft.

18. The wire spool despooler of claim 16, the trackway having a flared entrance at the distal end of the shaft.

19. The wire spool despooler of claim 16 further comprising a shaft body configured to be axially aligned and received on the shaft.

\* \* \* \* \*